(12) United States Patent
Venkataraman et al.

(10) Patent No.: US 12,223,210 B2
(45) Date of Patent: Feb. 11, 2025

(54) VIRTUAL COMPUTATIONAL STORAGE DEVICES

(71) Applicant: Samsung Electronics Co., Ltd., Suwon-si (KR)

(72) Inventors: Gayathiri Venkataraman, Santa Clara, CA (US); Vishwanath Maram, San Jose, CA (US); Matthew Shaun Bryson, Los Gatos, CA (US)

(73) Assignee: Samsung Electronics Co., Ltd., Suwon-Si (KR)

( * ) Notice: Subject to any disclaimer, the term of this patent is extended or adjusted under 35 U.S.C. 154(b) by 0 days.

(21) Appl. No.: 18/229,902

(22) Filed: Aug. 3, 2023

(65) Prior Publication Data

US 2023/0384981 A1 Nov. 30, 2023

Related U.S. Application Data

(63) Continuation of application No. 17/351,114, filed on Jun. 17, 2021, now Pat. No. 11,755,251.

(Continued)

(51) Int. Cl.
*G06F 3/06* (2006.01)

(52) U.S. Cl.
CPC .......... *G06F 3/0664* (2013.01); *G06F 3/0604* (2013.01); *G06F 3/0635* (2013.01); *G06F 3/0659* (2013.01); *G06F 3/0679* (2013.01)

(58) Field of Classification Search
CPC ......... G06F 2009/45579; G06F 9/5077; G06F 12/063; G06F 12/1081; G06F 2212/151; G06F 15/7821; G06F 17/16; G06F 3/0664; G06F 3/0604; G06F 3/0635; G06F 3/0659; G06F 3/0679; G06F 9/45533;

(Continued)

(56) References Cited

U.S. PATENT DOCUMENTS 9,501,245 B2   11/2016   Hussain et al.
10,348,830 B1   7/2019   Malwankar et al.

(Continued)

FOREIGN PATENT DOCUMENTS

CN        105830026 A     8/2016
DE   10 2019 102 643 A1   9/2019

(Continued)

OTHER PUBLICATIONS

Office Action for Korean Application No. 10-2022-0062642 dated Mar. 30, 2023, 4 pages.

(Continued)

*Primary Examiner* — Charles Rones
*Assistant Examiner* — Hewy H Li
(74) *Attorney, Agent, or Firm* — Lewis Roca Rothgerber Christie LLP

(57) ABSTRACT

A system includes a virtual computational storage emulation module configured to provide a virtual computational storage device. The system further includes a storage element, where the virtual computational storage emulation module is configured to store data associated with the virtual computational storage device at the storage element. The system further includes a compute element. The virtual computational storage emulation module is configured to send a compute request associated with the virtual computational storage device to the compute element.

20 Claims, 16 Drawing Sheets

Related U.S. Application Data

(60) Provisional application No. 63/196,081, filed on Jun. 2, 2021.

(58) Field of Classification Search
CPC ............. G06F 9/45508; G06F 9/45516; G06F 9/45558; G06F 15/7867; G06F 2009/4557
See application file for complete search history.

(56) References Cited

U.S. PATENT DOCUMENTS

| | | | |
|---|---|---|---|
| 10,671,301 | B2 | 6/2020 | Prasad et al. |
| 10,680,969 | B1 | 6/2020 | Quinn et al. |
| 10,684,879 | B2 | 6/2020 | Aron et al. |
| 10,852,954 | B1 | 12/2020 | Krasner et al. |
| 11,416,298 | B1 | 8/2022 | Barker, Jr. et al. |
| 2002/0052914 | A1* | 5/2002 | Zalewski ............... G06F 9/5077 711/123 |
| 2004/0193803 | A1* | 9/2004 | Mogi ................. G06F 12/0871 711/171 |
| 2012/0297383 | A1 | 11/2012 | Meisner et al. |
| 2015/0254088 | A1* | 9/2015 | Chou ................. H04L 67/1097 718/1 |
| 2017/0147370 | A1 | 5/2017 | Williamson |
| 2017/0285968 | A1 | 10/2017 | Jung et al. |
| 2018/0024853 | A1* | 1/2018 | Warfield ............. G06F 9/45558 718/1 |
| 2018/0239543 | A1 | 8/2018 | Venetsanopoulos et al. |
| 2019/0108106 | A1* | 4/2019 | Aggarwal ............. G06F 9/4856 |
| 2020/0174819 | A1 | 6/2020 | Dong et al. |
| 2020/0201575 | A1* | 6/2020 | Mizrahi ............... G06F 13/4295 |
| 2020/0233687 | A1 | 7/2020 | Franciosi et al. |
| 2021/0173790 | A1* | 6/2021 | Kakaiya ............. G06F 12/1009 |
| 2021/0349841 | A1* | 11/2021 | Makhervaks ......... G06F 3/0607 |
| 2021/0373951 | A1 | 12/2021 | Malladi et al. |

FOREIGN PATENT DOCUMENTS

| | | |
|---|---|---|
| KR | 10-2017-0061675 A | 6/2017 |
| WO | WO 2019/061014 A1 | 4/2019 |

OTHER PUBLICATIONS

Barbalace, Antonio, and Jaeyoung Do. "Computational storage: Where are we today ?." CIDR, Jan. 10-13, 2021. (Year: 2021).

Joo, Yongsoo, et al. "Rapid prototyping and evaluation of intelligence functions of active storage devices." IEEE Transactions on Computers 63.9 (2013): 2356-2368. (Year: 2013).

Molgaard, Jason, "A Simple Approach to Implementing Computational Storage," Storage Solutions Architect Arm, Sep. 2019, 25 pages, Retrieved from the Internet: URL:https://www.snia.org/sites/defau1Vfiles/SDC/2019/presentations/Computational/Molga ard_Jason_A_Simple_Approach_to_ Implementing_Computational_Storage.pdf.

Siemens Digital Industries Software, "Virtual Verification of Computational Storage Devices," 2020, 10 pages.

Wilcox, Peter, et al. "Design for Computational Storage Simulation Platform," CHEOPS'21: Proceedings of the Workshop on Challenges and Opportunities of Efficient and Performant Storage Systems, Apr. 2021, 8 pages.

EPO Extended European Search Report dated Oct. 21, 2022, issued in corresponding European Patent Application No. 22176078.8 (9 pages).

Gibb, Sean, et al., "An NVMe-based Offload Engine for Storage Acceleration," SDC, Storage Developer Conference, 2017, 21 pages, Retrieved from the Internet: URL:https://www.snia.org/sites/defaulVfiles/SDC/2017/presentations/NVMe/Gibb_Sean_Bates_Stephen_An_NVMe.based_Offload_Engine_for_Storage_Acceleration.pdf.

EPO Office Action dated Nov. 2, 2022, issued in European Patent Application No. 22176078.8 (7 pages).

* cited by examiner

VIRTUAL COMPUTATIONAL STORAGE DEVICES

CROSS-REFERENCE TO RELATED APPLICATION(S)

The present application is a continuation application of U.S. patent application Ser. No. 17/351,114 filed Jun. 17, 2021, which claims priority to and the benefit of U.S. Provisional Application No. 63/196,081, filed Jun. 2, 2021 entitled "Virtual Computational Storage Devices," the entire contents of each of which is incorporated herein by reference.

FIELD

The present disclosure generally relates to systems and methods for virtual computational storage devices.

BACKGROUND

Computational storage devices provide computation functions and data storage. Accordingly, a host device may store data at and offload computations to a computational storage device. However, computing systems may include storage devices that do not support computation functions.

The above information disclosed in this Background section is only for enhancement of understanding of the background of the disclosure and therefore it may contain information that does not constitute prior art.

SUMMARY

In various embodiments, described herein include systems, methods, and apparatuses related to virtual computational storage devices.

A system includes a virtual computational storage emulation module configured to provide a virtual computational storage device. The system further includes a storage element, where the virtual computational storage emulation module is configured to store data associated with the virtual computational storage device at the storage element. The system further includes a compute element. The virtual computational storage emulation module is configured to send a compute request associated with the virtual computational storage device to the compute element.

A method includes providing, at a virtual computational storage device emulation module, a virtual computational storage device. Data associated with the virtual computational storage device is stored at a storage element. The method further includes receiving, at the virtual computational storage device emulation module, a compute request for the virtual storage device. The method further includes sending a translation of the compute request to a compute element.

A system includes a compute element of a first device and a storage element of a second device. The system further includes a computational storage client and a processor. The processor is configured to receive a compute request from the computational storage client. The processor is further configured to send a translation of the compute request to the compute element of the first device. The processor is further configured to receive a storage request from the computational storage client. The processor is further configured to send a translation of the storage request to the storage element of the second device.

BRIEF DESCRIPTION OF THE DRAWINGS

The above-mentioned aspects and other aspects of the present techniques will be better understood when the present application is read in view of the following figures in which like numbers indicate similar or identical elements.

Figure 1A:
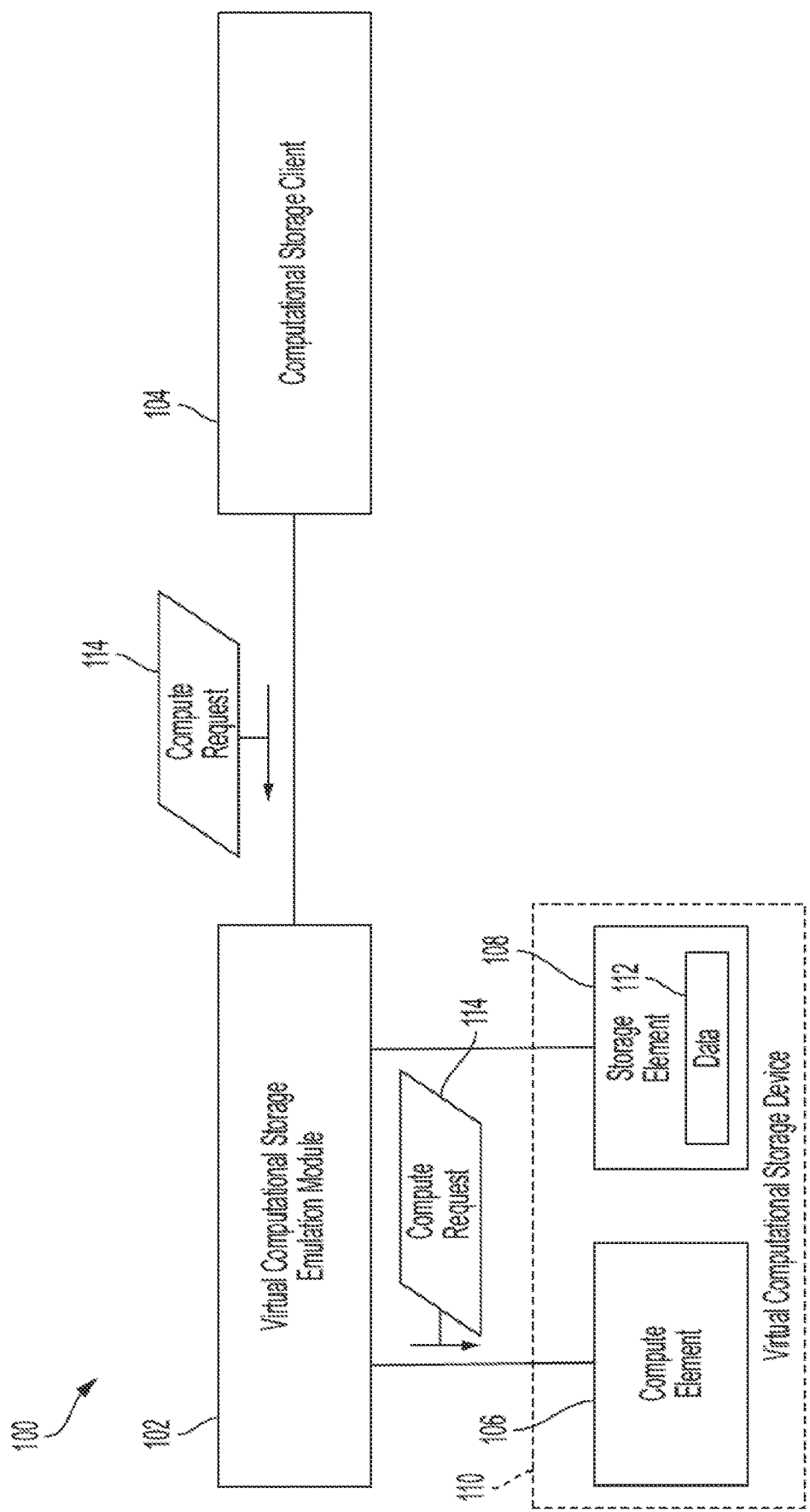
FIG. 1A is a block diagram of a system for providing a virtual computational storage device.

While the present techniques are susceptible to various modifications and alternative forms, specific embodiments thereof are shown by way of example in the drawings and will herein be described. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF DRAWINGS

The details of one or more embodiments of the subject matter described herein are set forth in the accompanying drawings and the description below. Other features, aspects, and advantages of the subject matter will become apparent from the description, the drawings, and the claims.

Various embodiments of the present disclosure now will be described more fully hereinafter with reference to the accompanying drawings, in which some, but not all embodiments are shown. Indeed, the disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Like numbers refer to like elements throughout. Arrows in each of the figures depict bi-directional data flow and/or bi-directional data flow capabilities. The terms "path," "pathway" and "route" are used interchangeably herein.

Embodiments of the present disclosure may be implemented in various ways, including as computer program products that comprise articles of manufacture. A computer program product may include a non-transitory computer-readable storage medium storing applications, programs, program components, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (for example a solid-state drive (SSD)), solid state card (SSC), solid state component (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (for example Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory component (RIMM), dual in-line memory component (DIMM), single in-line memory component (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present disclosure may also be implemented as methods, apparatus, systems, computing devices, computing entities, and/or the like. As such, embodiments of the present disclosure may take the form of an apparatus, system, computing device, computing entity, and/or the like executing instructions stored on a computer-readable storage medium to perform certain steps or operations. Thus, embodiments of the present disclosure may also take the form of an entirely hardware embodiment, an entirely computer program product embodiment, and/or an embodiment that comprises combination of computer program products and hardware performing certain steps or operations.

Embodiments of the present disclosure are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (for example the executable instructions, instructions for execution, program code, and/or the like) on a computer-readable storage medium for execution. For example, retrieval, loading, and execution of code may be performed sequentially such that one instruction is retrieved, loaded, and executed at a time. In some example embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

As used herein, a computational storage device refers to a storage device that supports computational tasks. For example, a computational storage device may include a storage element (e.g., non-volatile memory, such as flash memory, etc.) and a compute element (e.g., a central processor unit (CPU), graphics processor unit (GPU), a field programmable gate array (FPGA), an application specific integrated circuit (ASIC) (such as a tensor processing unit), processor core, etc.) and be configured to support storage of data at the compute element and execution of computational tasks at the compute element. Accordingly, a computational storage device may provide storage capabilities to a computational storage client (e.g., a computing device) and may support offloading of computational tasks from the computational storage client to the computational storage device. Referring to FIG. 1A, a block diagram depicting a system 100 for providing a virtual computational storage device is shown.

The system 100 includes a virtual computational storage emulation module 102, a compute element 106, a storage element 108, and a computational storage client 104. The virtual computational storage emulation module 102 may correspond to software (e.g., a hypervisor) executable by a processing device (not shown) of a computing device (e.g., a server device) to provide access to a virtual computational storage device 110. The virtual computational storage device 110 may be a logical construct rather than a physical computational storage device. The virtual computational storage emulation module 102 provides the virtual computational storage device 110 by emulating (e.g., reproducing) functions of a physical computational storage device. Functions of the virtual computational storage device 110 are implemented by the compute element 106 and the storage element 108. The virtual computational storage emulation module 102 is configured to emulate a physical computational storage device, to provide storage request translation, and to provide compute request translation, as described further herein. The compute element 106 and the storage element 108 may be components of a physical computational storage device or one or more other types of devices.

The compute element 106 may correspond to a CPU, a GPU, an FPGA, an ASIC, a processor core, another type of processor element, or a combination thereof. The storage element 108 may correspond to a solid state drive, a hard disk drive, another type of non-volatile memory, or a combination thereof. The compute element 106 and the storage element 108 may correspond to distinct devices or to a single device. For example, the compute element 106 and the storage element 108 may correspond to a physical computational storage device. In some implementations, the compute element 106 and the storage element 108 are internal to a device that executes the virtual computational storage emulation module 102. In some implementations, the compute element 106 and the storage element 108 are external to a device that executes the virtual computational storage emulation module 102. While a single compute element and a single storage element are shown, the system 100 may include additional compute elements and additional storage elements. Further, while the virtual computational storage device 110 is shown as being supported by a single compute element and a single storage element, the virtual computational storage device 110 may be supported by more than one compute element and/or more than one storage element. Further, the virtual computational storage emulation module 102 may provide more than one virtual computational storage device. Communications between the virtual computational storage emulation module 102 and the compute element 106 and the storage element 108 may be carried over a peripheral component interconnect (PCI) link, a PCI express (PCIe) link, a serial advanced technology attachment (SATA) link, a serial attached small computer system interface (SATA) link, a fibre-channel, an Ethernet link, an Institute of Electrical and Electronics Engineers (IEEE) 802.11 link, another type of link, or a combination thereof. Communications between the virtual computational storage emulation module 102 and the compute element 106 and the storage element 108 may include non-volatile memory express (NVMe) communications.

The computational storage client 104 corresponds to a computing device or software configured to issue compute requests and storage requests to the virtual computational storage emulation module 102. In implementations in which the computational storage client 104 corresponds to software, the computational storage client 104 may correspond to a virtual computing device provided by a hypervisor executing instructions at a compute element (such as the compute element 106) to emulate a computing device. Communications between the computational storage client 104 and the virtual computational storage emulation module 102 may be carried over a peripheral component interconnect (PCI) link, a PCI express (PCIe) link, a serial advanced technology attachment (SATA) link, a serial attached small computer system interface (SATA) link, a fibre-channel, an Ethernet link, an Institute of Electrical and Electronics Engineers (IEEE) 802.11 link, another type of link, or a combination thereof. Communications between the virtual computational storage emulation module 102 and the compute element 106 and the storage element 108 may include non-volatile memory express (NVMe) communications.

In operation, the storage element 108 stores data 112 associated with the virtual computational storage device 110 and the compute element 106 executes compute requests associated with the virtual computational storage device 110. The data 112 may be written to the storage element 108 by the virtual computational storage emulation module 102 responsive to a request from the computational storage client 104. As shown in FIG. 1A, the virtual computational storage emulation module 102 provides compute request translation.

In the illustrated example, the computational storage client 104 sends a compute request 114 to the virtual computational storage emulation module 102. The compute request 114 may be addressed to the virtual computational storage device 110. The virtual computational storage emulation module 102 may maintain a mapping of the virtual computational storage device 110 to the compute element 106 and translate the compute request 114 as a request for the compute element 106 accordingly. Therefore, the virtual computational storage emulation module 102 may forward the compute request 114 to the compute element 106. It should be noted that while the above example describes the compute request 114 being forwarded to the compute element 106, in practice a different message may be sent to the compute element 106 than is received by the virtual computational storage emulation module 102 from the computational storage client 104. For example, the compute request 114 may correspond to an NVMe request, such as an NVMe command to load and/or execute a program, (or other type of request), but the compute element 106 may not support NVMe (or another type of protocol). Accordingly, the virtual computational storage emulation module 102 may translate the compute request 114 into a translated message of a protocol supported by the compute element 106. The virtual computational storage emulation module 102 may forward the translated message to the compute element 106 rather than the compute request 114. As indicated above, the virtual computational storage emulation module 102 may support emulation of a physical computational storage device. Translation of compute requests may comprise one aspect of this emulation.

In some implementations, the virtual computational storage device 110 may correspond to more than one compute element. In such cases, the virtual computational storage emulation module 102 may select which compute element to forward the compute request 114 to based on a load balancing algorithm. In addition or the alternative, the virtual computational storage emulation module 102 may select a compute element to forward the compute request 114 to based on an address of data targeted by the compute request 114. For example, the virtual computational storage emulation module 102 may forward the compute request 114 to a particular computational storage device in response to determining that the compute request 114 targets data stored on the particular computational storage device.

The compute element 106 may return a result (not shown) of the compute request 114 to the computational storage client 104 directly or through the virtual computational storage emulation module 102. Similarly, the compute element 106 may communicate with the storage element 108 directly or through the virtual computational storage emulation module 102. For example, the compute request 114 may target the data 112. The compute element 106 may retrieve the data 112 directly from the storage element 108 or the virtual computational storage emulation module 102 may retrieve the data 112 from the storage element 108 and forward the data 112 to the compute element 106 with the compute request 114. In embodiments in which the compute element 106 returns a result through the virtual computational storage emulation module 102, the virtual computational storage emulation module may translate the result into a protocol supported by the computational storage client 104 (e.g., a protocol configured to support communications between a computational storage client and a computational storage device). As indicated above, the virtual computational storage emulation module 102 may support emulation of a physical computational storage device. Translation of compute request results may comprise one aspect of this emulation.

Figure 1B:
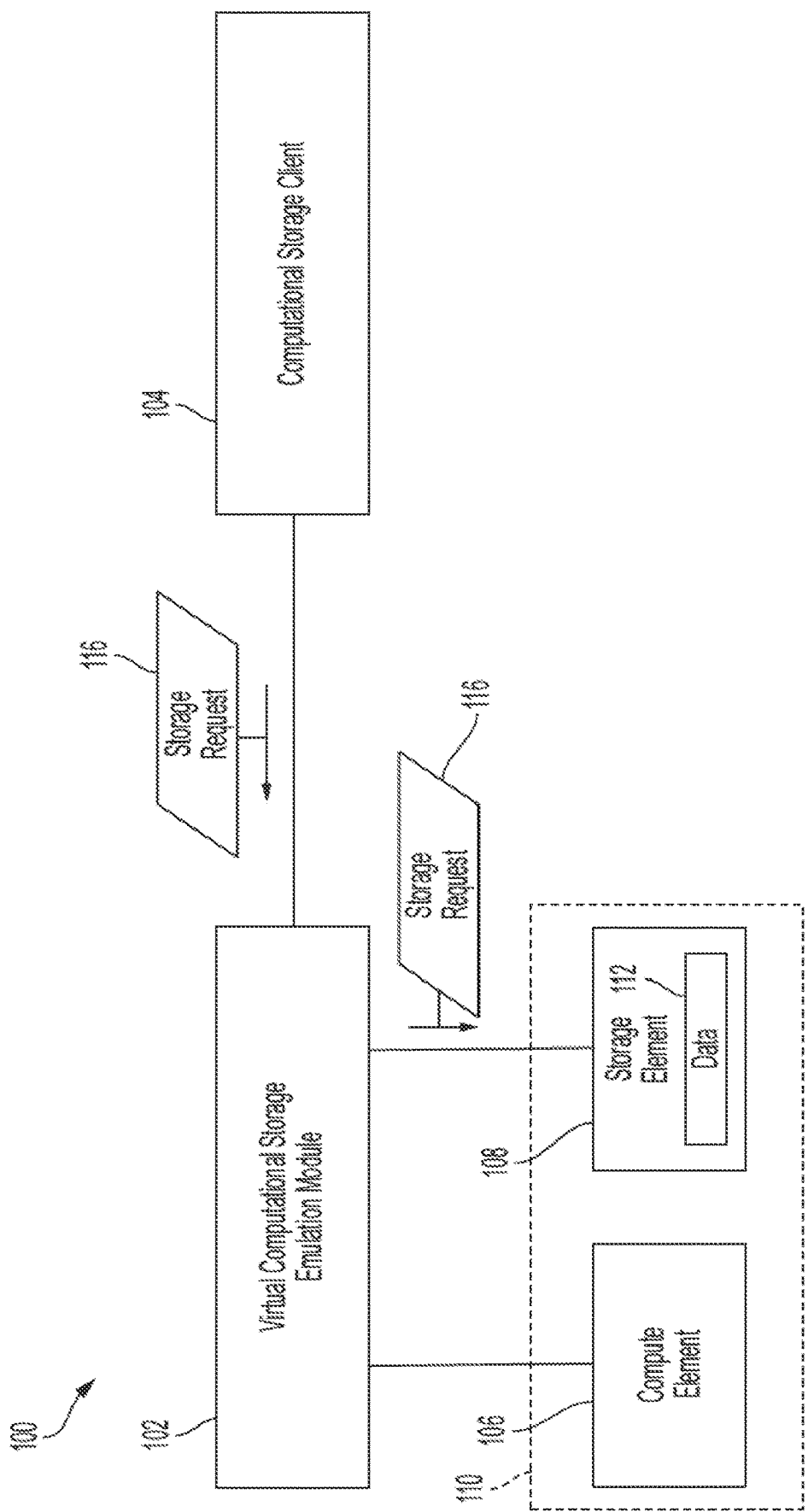
FIG. 1B is a block diagram of storage request handling in a system for providing a virtual computational storage device.

FIG. 1B illustrates an example in which the virtual computational storage emulation module 102 of the system 100 provides storage request translation. In the illustrated example, the computational storage client 104 sends a storage request 116 to the virtual computational storage emulation module 102. The storage request 116 may correspond to a read request or a write request. In some implementations, the storage request 116 corresponds to an NVMe request. The storage request 116 is directed to the virtual computational storage device 110. The virtual computational storage emulation module 102 maintains a mapping between virtual computational storage devices and storage elements. Based on the mapping, the virtual computational storage emulation module 102 may forward the storage request 116 to the storage element 108. It should be noted that while the above example describes the storage request 116 being forwarded to the storage element 108, in practice a different message may be sent to the storage element 108 than is received by the virtual computational storage emulation module 102 from the computational storage client 104. For example, the storage request 116 may correspond to an NVMe request (or other type of request), but the storage element 108 may not support NVMe (or another type of protocol). Accordingly, the virtual computational storage emulation module 102 may translate the storage request 116 into a translated message of a protocol supported by the storage element 108. The virtual computational storage emulation module 102 may forward the translated message to the storage element 108 rather than the storage request 116. As indicated above, the virtual computational storage emulation module 102 may support emulation of a physical computational storage device. Translation of storage requests may comprise one aspect of this emulation.

In some implementations, the virtual computational storage device 110 may correspond to more than one storage element. In such cases, the virtual computational storage emulation module 102 may select a storage element to forward the storage request 116 to based on an address (e.g., a logical block address (LBA)) targeted by the storage request 116. For example, for each virtual computational storage device, the virtual computational storage emulation module 102 may maintain a mapping of storage elements to address (e.g., LBA) ranges. In examples in which the storage request 116 corresponds to a write request, the virtual computational storage emulation module 102 may select which storage element to forward the storage request 116 to based on a load balancing algorithm. The virtual computational storage emulation module 102 may update the mapping of addresses to storage elements to reflect which storage element the write request is sent to. For example, in response to sending a write for LBA A to a first storage element, the virtual computational storage emulation module 102 may update a mapping to indicate that LBA A is associated with the first storage element.

The compute element 106 may return a result (not shown) of the storage request 116 to the computational storage client 104 directly or through the virtual computational storage emulation module 102. For example, the storage element 108 may send the data 112 to the computational storage client 104 in response to a read request. As another example, the storage element 108 may send a read request to the computational storage client 104 in response to a write request (alternatively the virtual computational storage emulation module 102 may send the read request to the computational storage client 104). In examples in which results are returned through the virtual computational storage emulation module 102, the virtual computational storage emulation module 102 may translate the results into a protocol used by the computational storage client 104. As indicated above, the virtual computational storage emulation module 102 may support emulation of a physical computational storage device. Translation of storage request results may comprise one aspect of this emulation. Emulation is described further with respect to FIG. 1C.

In some examples, the storage request 116 corresponds to a request to write the data 112 to the storage element 108. The virtual computational storage emulation module 102 may translate the storage request 116 and forward it to the storage element 108 as described above.

Figure 1C:
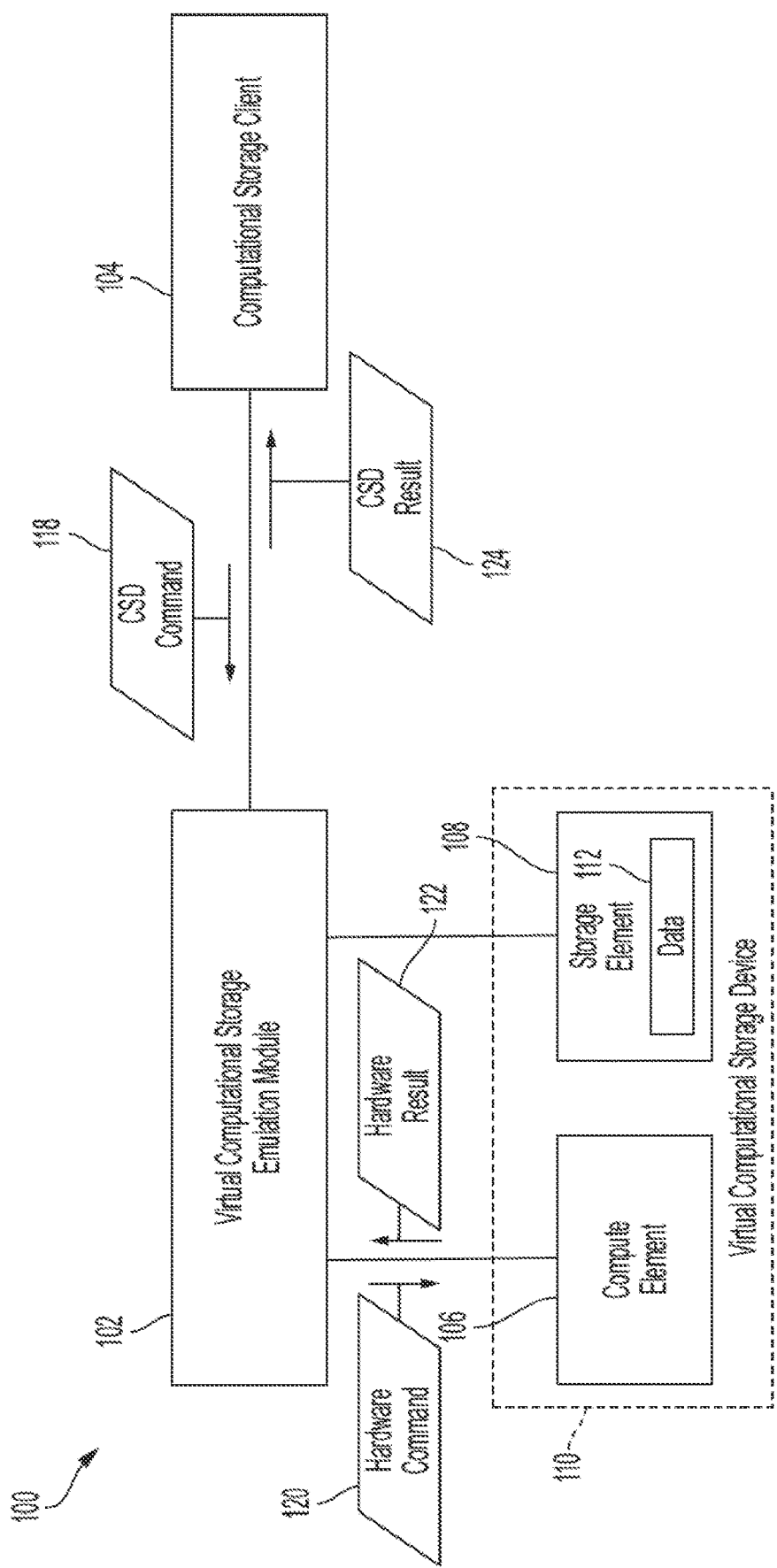
FIG. 1C is a block diagram depicting command translation in a system for providing a virtual computational storage device.

FIG. 1C depicts an example of the system 100 providing emulation of a computational storage device. In the illustrated example, the computational storage client 104 and the virtual computational storage emulation module 102 communicate according to a protocol supported by computational storage devices (e.g., NVMe). The virtual computational storage emulation module 102 is configured to translate between these computational storage messages and messages according to one or more protocols supported by the compute element 106 and the storage element 108.

In the illustrated example, the computational storage client 104 sends a computational storage (CSD) command 118 (e.g., a compute command, a storage command, or another type of command) to the virtual computational storage emulation module 102. The CSD command 118 conforms to a CSD protocol (e.g., NVMe) supported by the computational storage client 104 and the virtual computational storage emulation module 102. The virtual computational storage emulation module 102 translates the CSD command 118 into a hardware command 120 that conforms to a protocol utilized by the compute element 106 and sends the hardware command 120 to the compute element 106. Part of the translation may include translating an address identified in the CSD command 118 to an address associated with the storage element 108. For example, an LBA A of the virtual computational storage device 110 may be mapped to an LBA B at the storage element 108. In some implementations, the virtual computational storage emulation module 102 may fetch data from the storage element 108 based on the translated address and include the fetched data in the hardware command 120. While the previous example describes both the virtual computational storage device and the storage element 108 supporting LBAs, the virtual computational storage device 110 and the storage element 108 may support different types of addressing schemes (e.g., key-value). The virtual computational storage emulation module 102 may translate between an addressing scheme presented by the virtual computational storage device 110 and an addressing scheme supported by the storage element 108. In response to the hardware command 120, the compute element 106 generates a hardware result 122 and sends the hardware result 122 to the virtual computational storage emulation module 102. The virtual computational storage emulation module 102 translates the hardware result 122 into a CSD result 124 that conforms to the CSD protocol utilized by the computational storage client 104 and transmits the CSD result 124 to the computational storage client 104.

While FIG. 1C depicts an example in which the CSD command 118 corresponds to a compute command, it should be noted that the virtual computational storage emulation module 102 may provide similar translation of storage commands. For example the CSD command 118 may correspond to a storage request. Accordingly, the virtual computational storage emulation module 102 may translate the CSD command 118 into the hardware command 120 and send the hardware command 120 to the storage element 108. As described above, the CSD command 118 and the hardware command 120 may be of different protocols and/or utilize different addressing schemes. In this case, the storage element 108 may return the hardware result 122 (e.g., including the data 112) to the virtual computational storage emulation module 102 and the virtual computational storage emulation module 102 may translate the hardware result 122 into the CSD result 124 and send the CSD result 124 to the computational storage client 104. Thus, the virtual computational storage emulation module 102 may provide translation of both compute and storage commands addressed to a virtual computational storage device.

In addition to providing translation of computational storage device messages, the virtual computational storage emulation module 102 may emulate other functions of a computational storage device. For example, the virtual computational storage emulation module 102 may maintain one or more submission queues (or other data structures) associated with a computational storage device in memory (not shown) of a computing device that executes the virtual computational storage emulation module. As another example, the virtual computational storage emulation module 102 may advertise availability of a computational storage device to the computational storage client 104 according to a CSD protocol. It should be noted that advertised capabilities may correspond to emulated capabilities. That is, the virtual computational storage emulation module 102 may advertise hardware capabilities and may implement the advertised hardware capabilities in software.

Thus, FIGS. 1A-1C illustrate a system for providing virtual computational storage devices. The system supports storage device translation and forwarding, computational device translation and forwarding, and emulation of other functions of a computational storage device. As described further below, the underlying hardware used by the virtual computational storage emulation module 102 to provide the virtual computational storage devices may take many forms. Therefore, the system 100 of FIGS. 1A-1C may provide functionality of a computational storage device to a computational storage client in a wide variety of hardware setups.

Figure 2A:
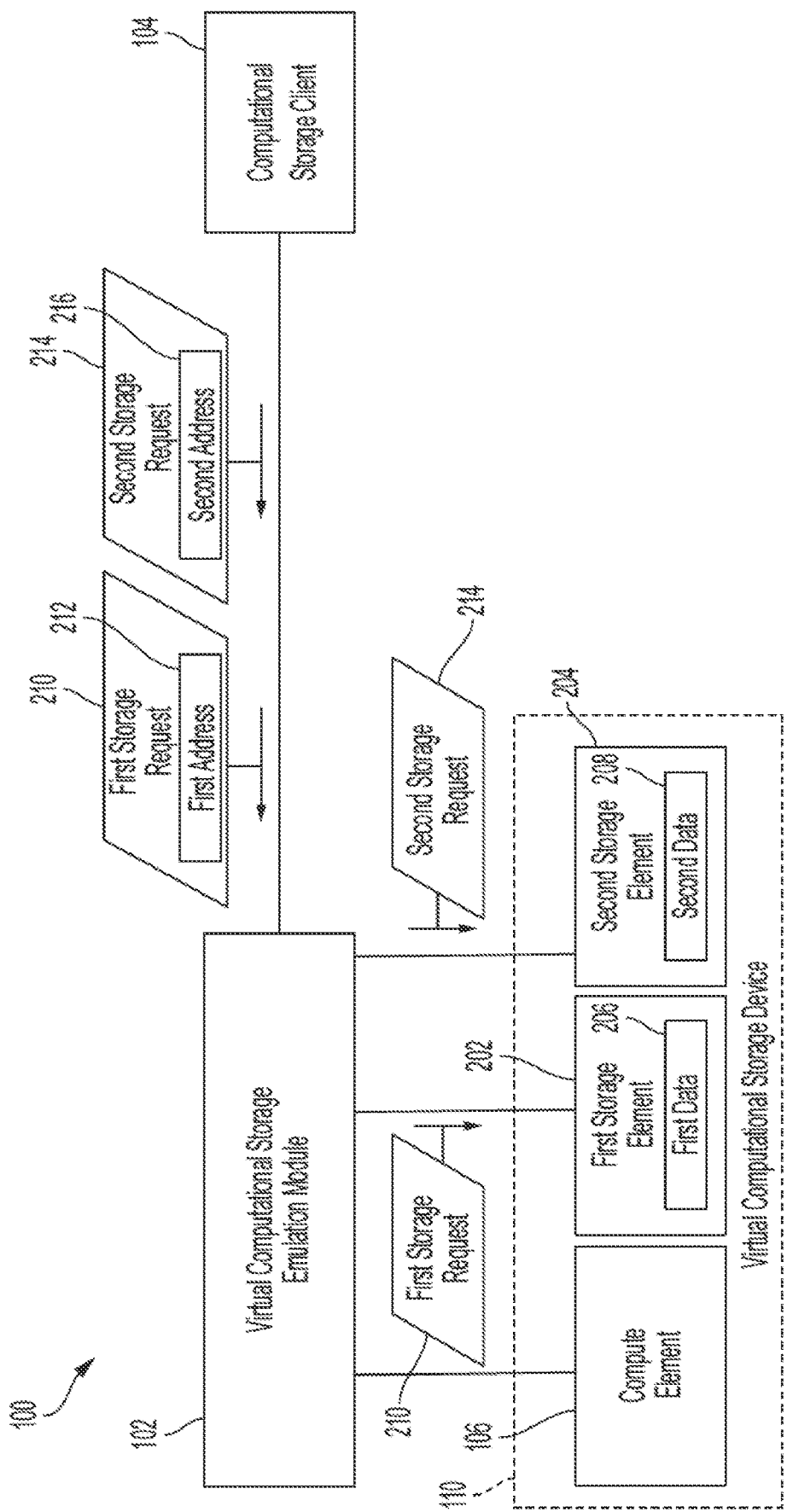
FIG. 2A is a block diagram of a system for providing a virtual computational storage device that is supported by more than one storage element.
Figure 2B:
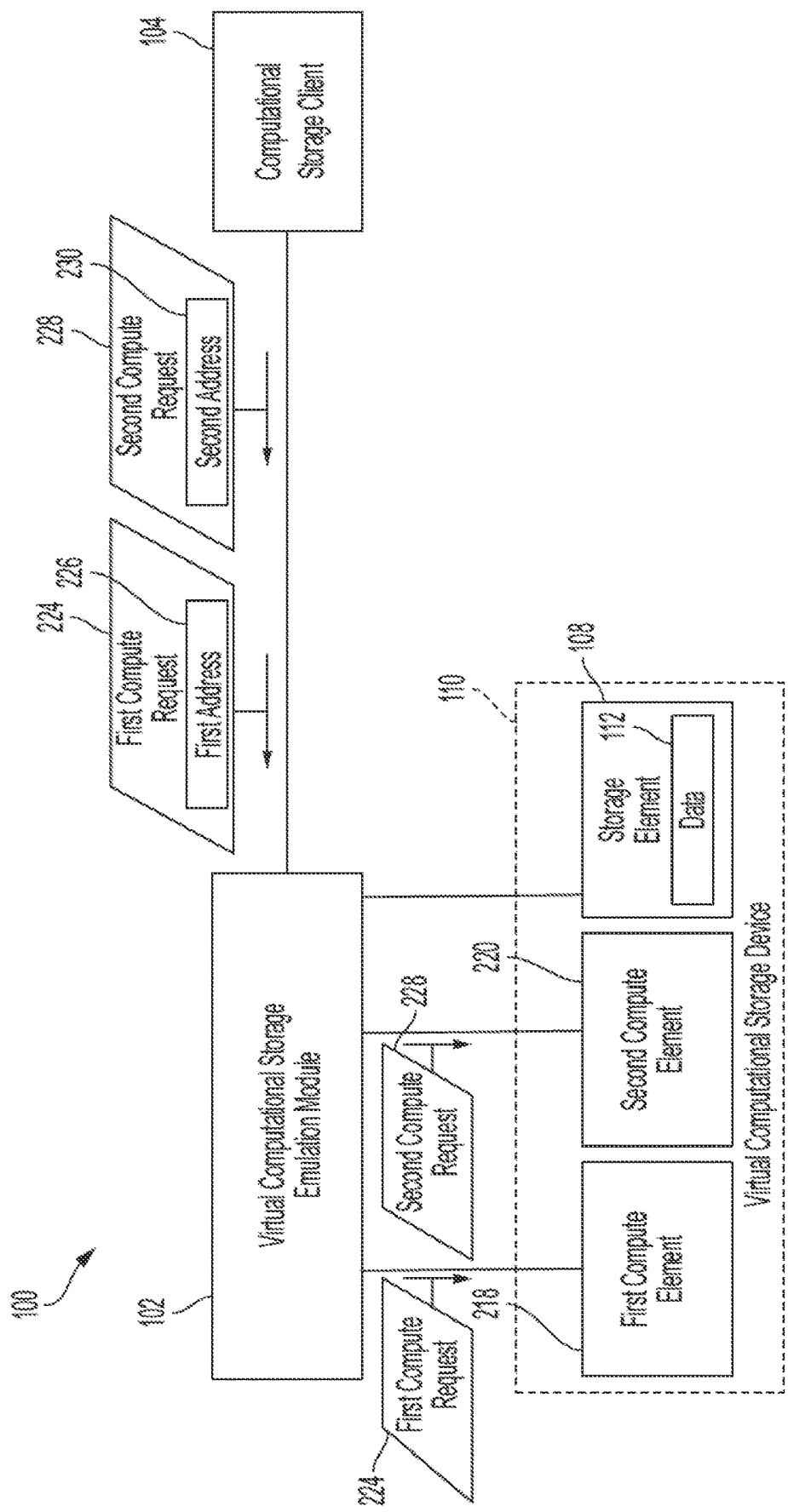
FIG. 2B is a block diagram of a system for providing a virtual computational storage device that is supported by more than one compute element.

As briefly described above, a virtual computational storage device provided by the virtual computational storage emulation module 102 may be supported by more than one storage element and/or more than one compute element. FIGS. 2A-2B illustrate several examples in which the virtual computational storage device is supported by additional physical components.

FIG. 2A illustrates an example of the system 100 in which the virtual computational storage device 110 corresponds to a first storage element 202 and a second storage element 204 in place of the storage element 108. The first storage element 202 stores first data 206 associated with the virtual computational storage device 110 and the second storage element 204 stores second data 208 associated with the virtual computational storage device 110.

The computational storage client 104 may send a first storage request 210 to the virtual computational storage emulation module 102. The first storage request 210 may identify a first address 212 (e.g., a first LBA). The virtual computational storage emulation module 102 may route the first storage request 210 to the first storage element 202 based on the first address 212. For example, the virtual computational storage emulation module 102 may store a mapping of addresses of the virtual computational storage device 110 addresses of the first storage element 202 and the second storage element 204. In some implementations, the first storage request 210 may correspond to a write request and the virtual computational storage emulation module 102 may send the first storage request 210 to the first storage element 202 based on a load balancing algorithm. For example, the virtual computational storage emulation module 102 may distribute write requests among storage elements in a round robin fashion (or according to some other algorithm). In response to writing data for a particular virtual storage device address to a particular address of a storage element, the virtual computational storage emulation module 102 may update the mapping of virtual computational storage device addresses to storage element addresses to indicate that the particular virtual storage device address is mapped to the particular address of the storage element.

In the illustrated example, the computational storage client 104 issues a second storage request 214 identifying a second address 216 and forwards the second storage request 214 to the second storage element 204. The virtual computational storage emulation module 102 may identify the second storage element 204 to receive the second storage request 214 using the techniques described above with respect to the first storage request 210. It should be noted that, as with the storage request 116 described above, the first storage request 210 and the second storage request 214 may be translated by the virtual computational storage emulation module 102 into messages that conform to one or more protocols utilized by the first storage element 202 and the second storage element 204. The first storage element 202 and the second storage element 204 may support different protocols.

FIG. 2B illustrates an example of the system 100 in which the virtual computational storage device 110 corresponds to a first compute element 218 and a second compute element 220 in place of the compute element 106. In the illustrated example, the computational storage client 104 sends a first compute request 224 and a second compute request 228 to the virtual computational storage emulation module 102. Both the first compute request 224 and the second compute request 228 are directed to the virtual computational storage device 110. The first compute request 224 identifies a first address 226 and the second compute request 228 identifies a second address 230. The virtual computational storage emulation module 102 forwards the first compute request 224 to the first compute element 218 and forwards the second compute request 228 to the second compute element 220. The virtual computational storage emulation module 102 may route the first compute request 224 to the first compute element 218 to the first compute element 218 based on the first address 226. For example, the virtual computational storage emulation module 102 may manage a mapping of virtual computational storage device addresses to compute elements. In another example, the virtual computational storage emulation module 102 may route compute requests according to a load balancing algorithm. As described above, the virtual computational storage emulation module 102 may translate the compute requests 224, 228 into a different protocol prior to forwarding to the compute elements 218, 220. In some implementations, the virtual computational storage emulation module 102 retrieves data associated with the first address 226 from the storage element 108 and forwards this data to the first compute element 218 with the first compute request 224. Similarly, the virtual computational storage emulation module 102 may retrieve data associated with the second address 230 from the storage element 108 and forward this data to the second compute element 220 with the second compute request 228.

It should be noted that a virtual computational storage device may correspond to more than one compute element and more than one storage element. In addition, while FIGS. 2A-2B show examples with 2 storage elements and 2 compute elements respectively, other numbers may of storage elements and/or compute elements may be utilized by the virtual computational storage emulation module 102 to provide a virtual computational storage device. Further, the virtual computational storage emulation module 102 may support more than one virtual computational storage device. Examples in which the virtual computational storage emulation module 102 supports more than one virtual computational storage device are shown in FIGS. 3A-3C.

Figure 3A:
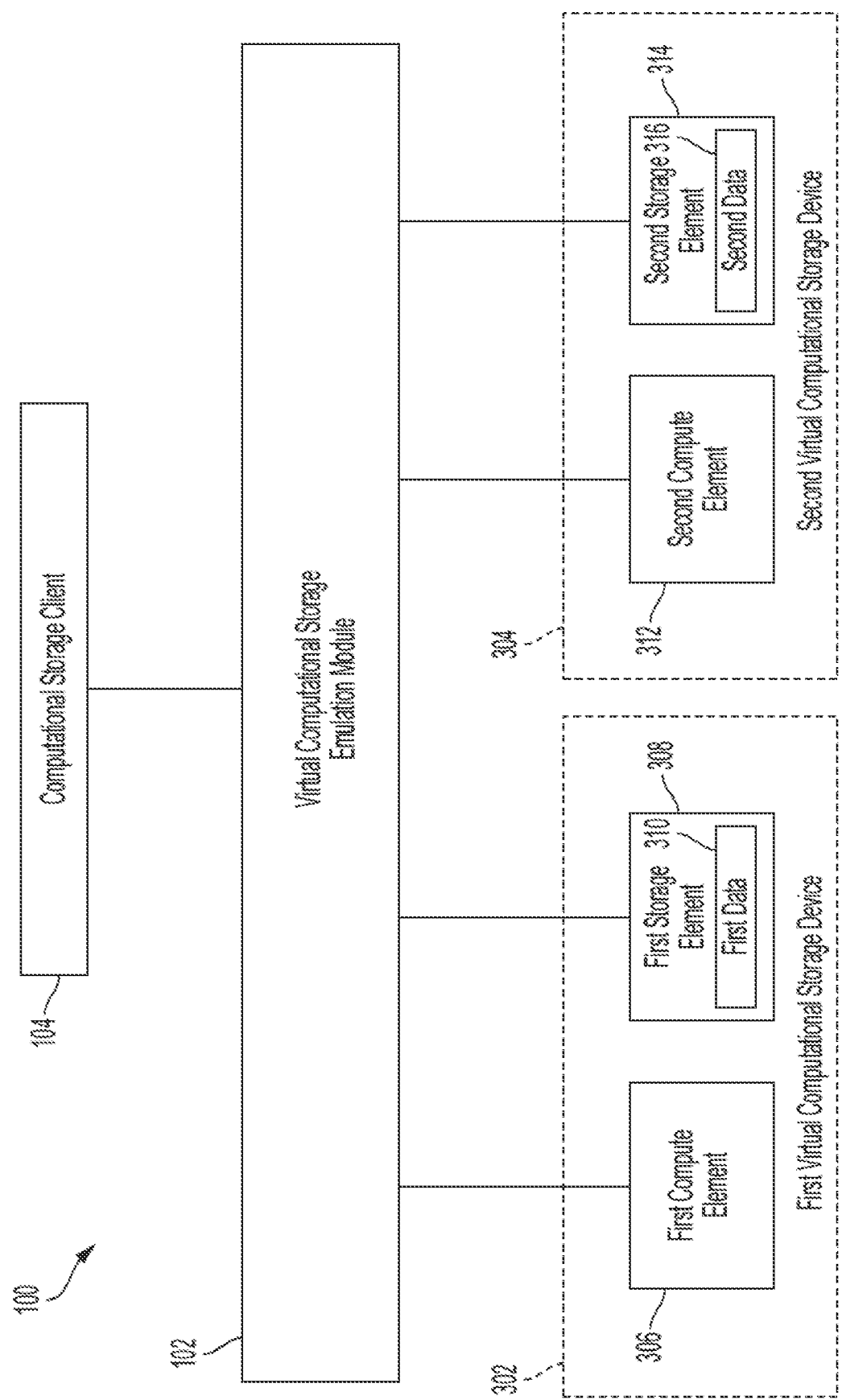
FIG. 3A is a block diagram of a system for providing more than one virtual computational storage device.
Figure 3B:
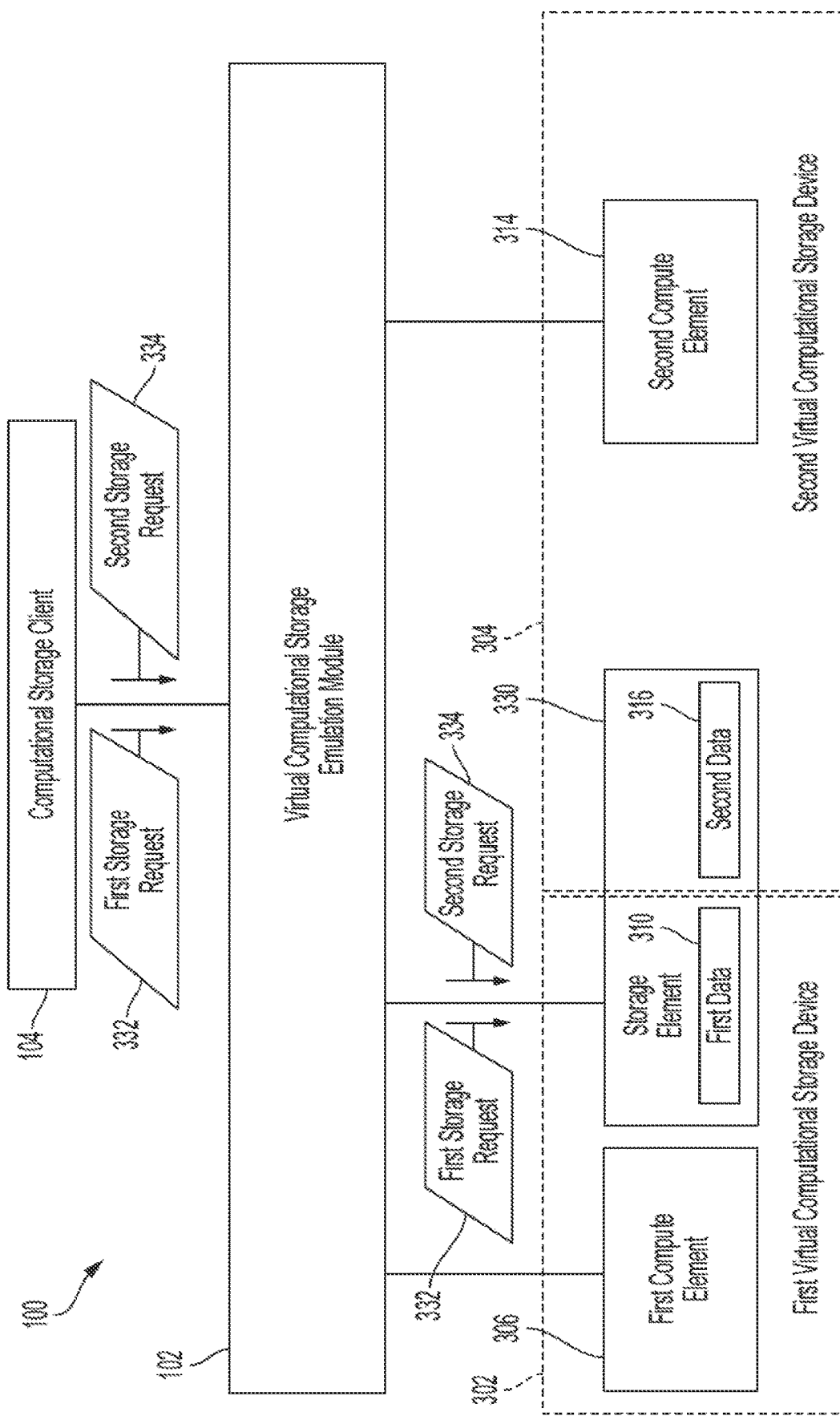
FIG. 3B is a block diagram of a system for providing more than one virtual computational storage device that share a storage element.
Figure 3C:
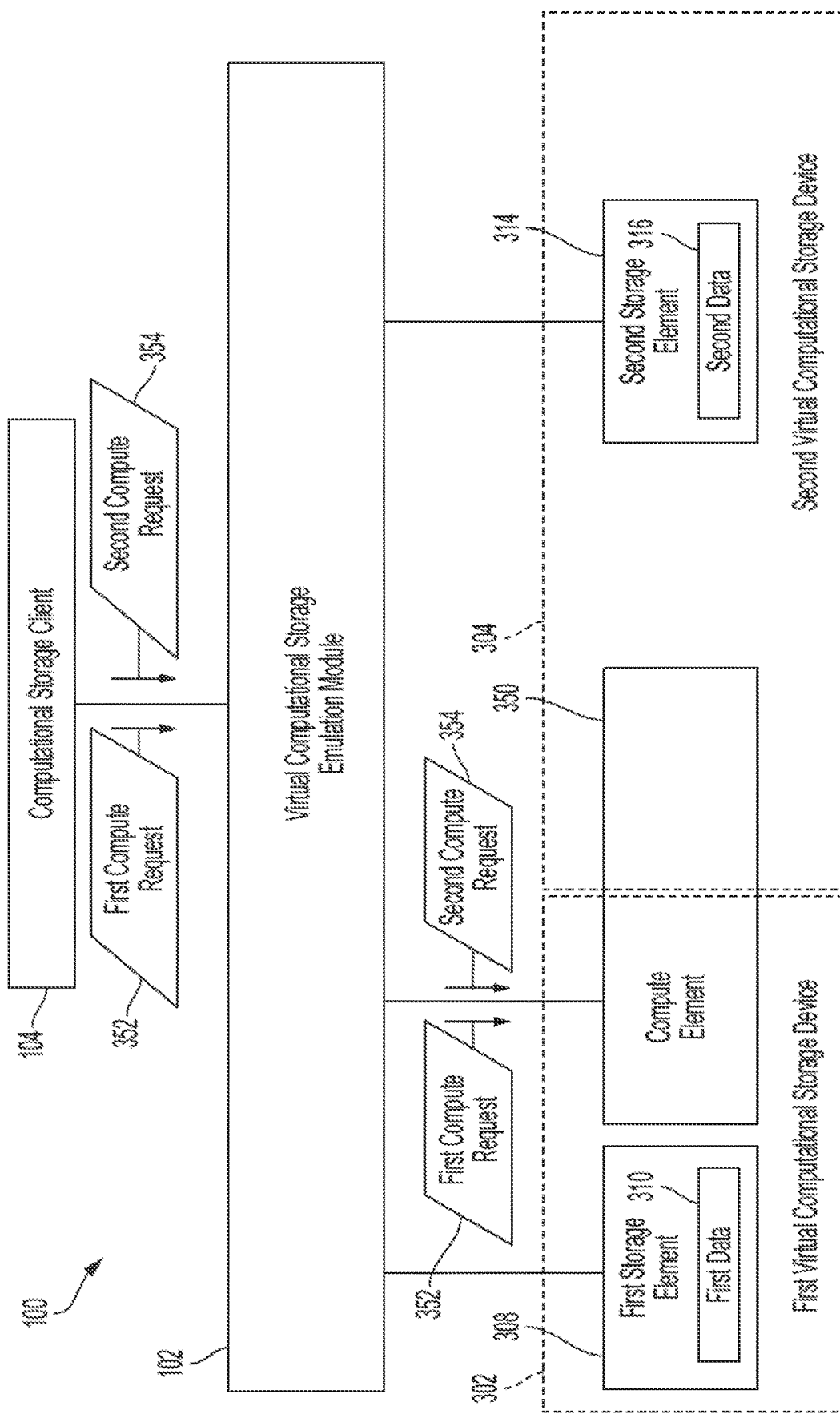
FIG. 3C is a block diagram of a system for providing more than one virtual computational storage device that share a compute element.

In FIG. 3A, the virtual computational storage emulation module 102 provides a first virtual computational storage device 302 and a second virtual computational storage device 304 in place of the virtual computational storage device 110. The first virtual computational storage device 302 is supported by a first compute element 306 and a first storage element 308. The first storage element 308 stores first data 310 associated with the first virtual computational storage device 302. The second virtual computational storage device 304 is supported by a second compute element 312 and a second storage element 314. The second storage element 314 stores second data 316 associated with the second virtual computational storage device 304.

The virtual computational storage emulation module 102 is configured to provide compute request translation, storage request translation, and virtual computational storage device emulation for the first virtual computational storage device and the second virtual computational storage device, as described above with reference to the virtual computational storage device 110. The virtual computational storage emulation module 102 may route storage commands (and translate the storage commands) for the first virtual computational storage device 302 to storage elements that support the first virtual computational storage device 302 (e.g., the first storage element 308). The virtual computational storage emulation module 102 may route compute commands (and translate the compute commands) for the first virtual computational storage device 302 to compute elements that support the first virtual computational storage device 302 (e.g., the first compute element 306). Similarly, the virtual computational storage emulation module 102 may route (and translate) compute and storage commands for the second virtual computational storage device 304 to devices that support the second virtual computational storage device 304 (e.g., the second compute element 312 and the second storage element 314). Further, the virtual computational storage emulation module 102 may emulate other functions of the first virtual computational storage device 302 and the second virtual computational storage device 304, as described above. For example, the virtual computational storage emulation module 102 may maintain submission queues associated with the virtual computational storage devices 302, 304, advertise availability of the virtual computational storage devices 302, 304, etc.

While FIG. 3A illustrates virtual computational storage devices supported by unique underlying physical devices, it should be noted that physical devices may be shared amongst virtual computational storage devices. FIG. 3B illustrates an example in which the first virtual computational storage device 302 and the second virtual computational storage device 304 share a storage element 330. Accordingly, the virtual computational storage emulation module 102 may forward (and/or translate) a first storage request 332 for the first virtual computational storage device 302 and a second storage request 334 for the second virtual computational storage device 304 to the storage element 330.

FIG. 3C illustrates an example in which the first virtual computational storage device 302 and the second virtual computational storage device 304 share a compute element 350. Accordingly, the virtual computational storage emulation module 102 may forward (and/or translate) a first compute request 352 for the first virtual computational storage device 302 and a second compute request 354 for the second virtual computational storage device 304 to the compute element 350. Thus, FIGS. 3A-3C illustrate different examples in which the virtual computational storage emulation module 102 supports more than one virtual computational storage device. As shown, different virtual computational storage devices may be supported by distinct underlying physical devices or may share underlying physical devices.

It should be noted that while the examples described herein include a single host, the virtual computational storage emulation module 102 may support more than one host. In some examples, virtual computational storage devices are exclusive to a host. In other examples, a virtual computational storage device is shared between hosts. It should further be noted that the virtual computational storage emulation module 102 may support virtual computational storage devices that have different functions. For example, the virtual computational storage emulation module 102 may provide a first virtual computational storage device that provides compression/decompression and a second virtual computational storage device that provides encryption/decryption. The virtual computational storage emulation module 102 may perform compression/decompression of data for requests associated with the first virtual computational storage device as part of emulating the first virtual computational storage device. Further, the virtual computational storage emulation module 102 may perform encryption/decryption of data for requests associated with the second virtual computational storage device as part of emulating the second virtual computational storage device.

As described above, the system 100 may provide virtual computational storage devices using compute and storage elements from various sources. Referring to FIG. 4, a system 400 for providing virtual computational storage devices. The system 400 includes a computing device 402. The computing device 402 includes a compute element 404 and a storage element 406. The compute element 404 may include a processing device, and may correspond to the compute element 106, the first compute element 218, the second compute element 220, the first compute element 306, or the second compute element 312 described above. The storage element 406 may include a non-volatile storage device and may correspond to the storage element 108, the first storage element 202, the second storage element 204, the first storage element 308, or the second storage element 314. The computing device 402 is configured to execute a hypervisor 408 that includes a virtual computational storage emulation module 410. The hypervisor 408 may be executed at the compute element 404 or at another processor of the computing device 402. The virtual computational storage emulation module 410 may correspond to the virtual computational storage emulation module 102 described above.

The hypervisor 408 is configured to provide a first virtual machine 412 and a second virtual machine 416. In some implementations, the first virtual machine 412 or the second virtual machine 416 correspond to the computational storage client 104. The virtual computational storage emulation module 410 is configured to present a first virtual computational storage device 414 to the first virtual machine 412 and a second virtual computational storage device 418 to the second virtual machine 416. The first virtual computational storage device 414 may correspond to the virtual computational storage device 110, the first virtual computational storage device 302, or the second virtual computational storage device 304. The second virtual computational storage device 418 may correspond to the virtual computational storage device 110, the first virtual computational storage device 302, or the second virtual computational storage device 304.

Figure 4A:
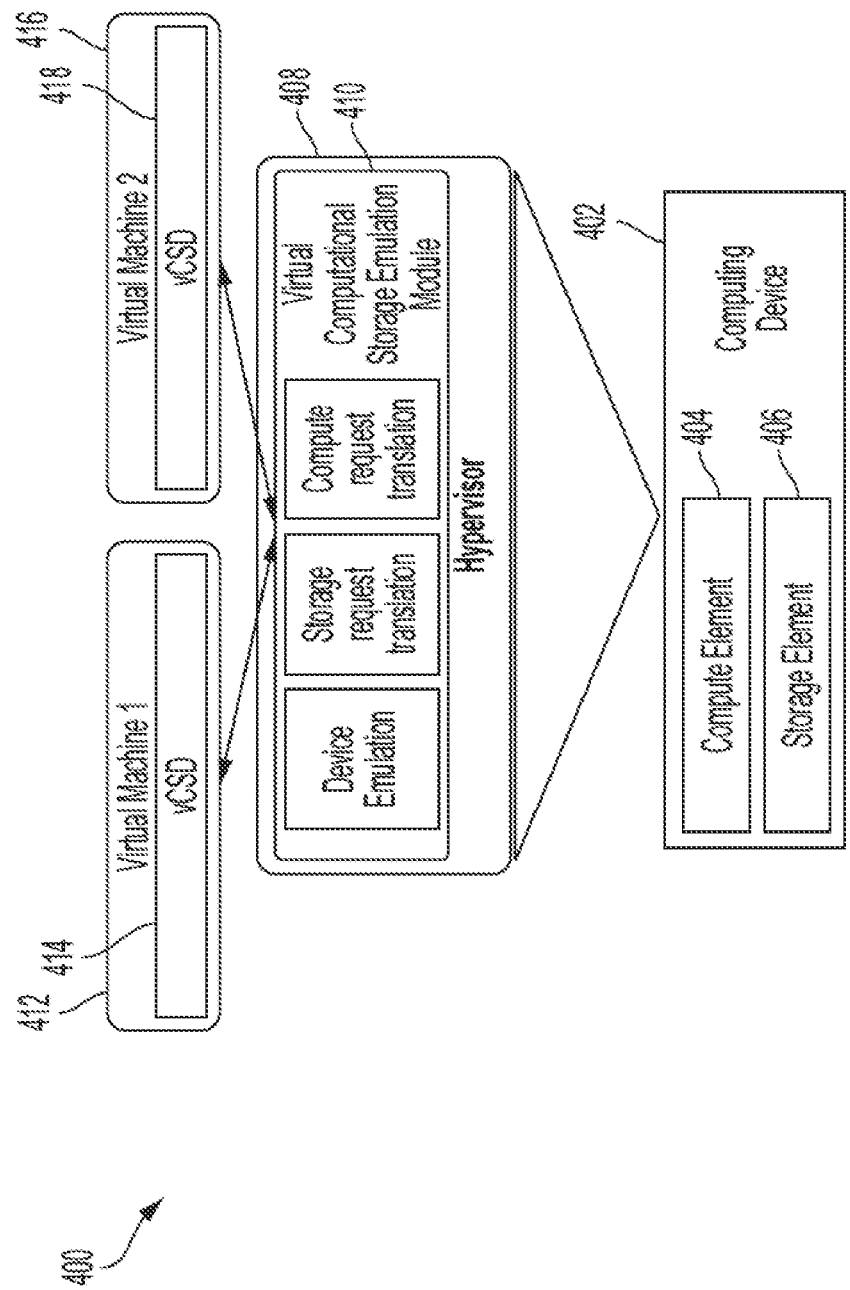
FIG. 4A is a block diagram of a system for providing a virtual computational storage device that is supported by components of a computing device executing a hypervisor.

The virtual computational storage emulation module 410 is configured to provide functionality of the virtual computational storage devices 414, 418 using components of the computing device 402. Thus, the virtual computational storage emulation module 410 may translate compute requests for the virtual computational storage devices 414, 418 into compute requests for the compute element 404 and translate storage requests for the virtual computational storage devices 414, 418 into storage requests for the storage element 406, as described above. Accordingly, FIG. 4A illustrates that a computing device (e.g., a server) may provide virtual computational storage device functionality using components of the computing device.

Figure 4B:
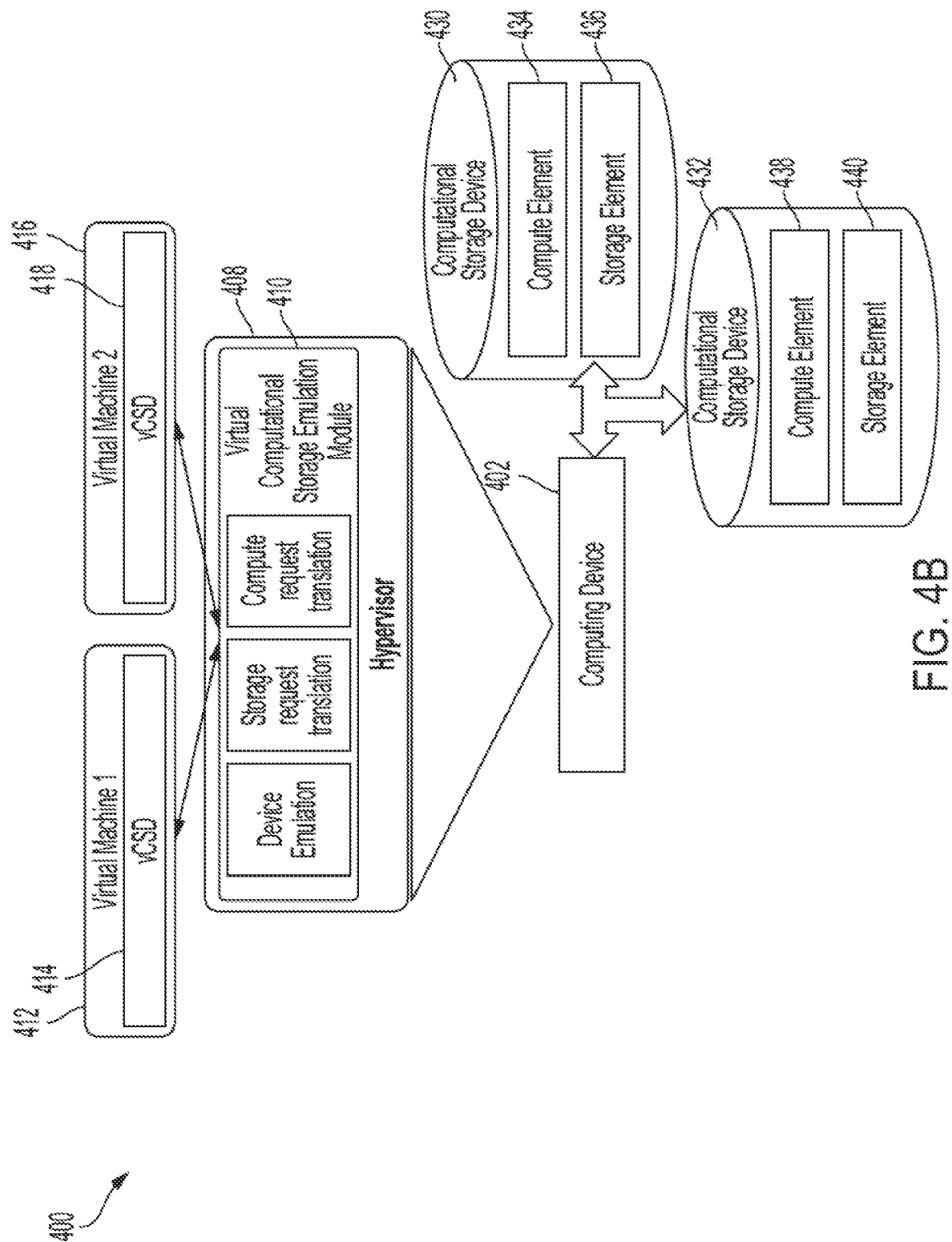
FIG. 4B is a block diagram of a system for providing a virtual computational storage device that is supported by physical computational storage devices.

Referring to FIG. 4B, an alternative implementation of the system 400 is shown in which the computing device 402 communicates (e.g., via PCIe or some other connection) with a first computational storage device 430 and a second computational storage device 432. The first computational storage device 430 includes a first compute element 434 and a first storage element 436. The second computational storage device 432 includes a first compute element 438 and a second compute element 440. The first compute element 434 may include a processing device, and may correspond to the compute element 106, the first compute element 218, the second compute element 220, the first compute element 306, or the second compute element 312 described above. Similarly, the second compute element 438 may include a processing device, and may correspond to the compute element 106, the first compute element 218, the second compute element 220, the first compute element 306, or the second compute element 312 described above. The first storage element 436 may include a non-volatile storage device and may correspond to the storage element 108, the first storage element 202, the second storage element 204, the first storage element 308, or the second storage element 314. Similarly, the second storage element 440 may include a non-volatile storage device and may correspond to the storage element 108, the first storage element 202, the second storage element 204, the first storage element 308, or the second storage element 314.

The virtual computational storage emulation module 410 is configured to provide functionality of the virtual computational storage devices 414, 418 using components of the computational storage devices 430, 432. Thus, the virtual computational storage emulation module 410 may translate compute requests for the virtual computational storage devices 414, 418 into compute requests for components of the first computational storage device 430 and/or components of the second computational storage device 432, as described above. Accordingly, FIG. 4B illustrates that components of physical computational storage devices may be virtualized by the disclosed systems.

Figure 4C:
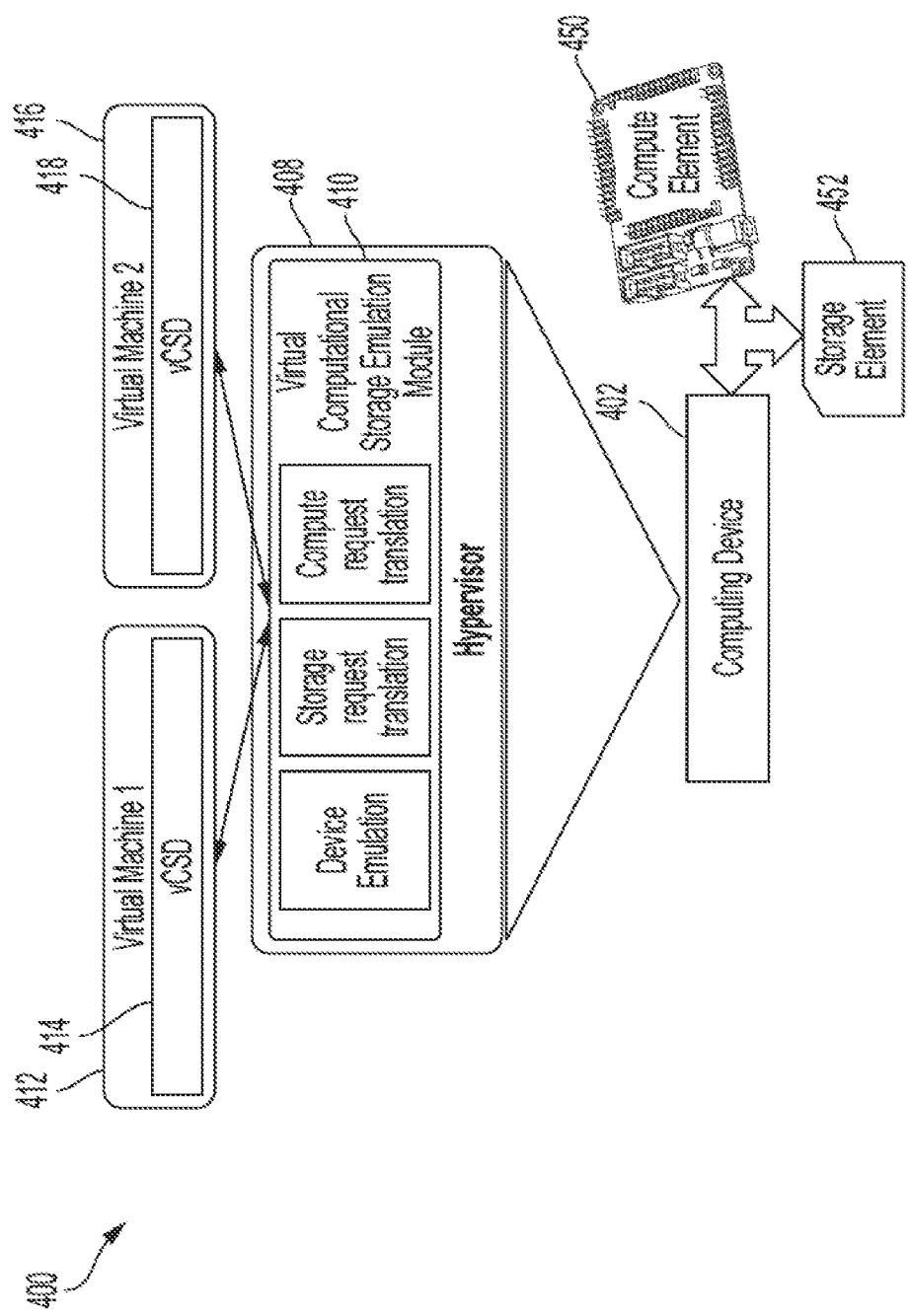
FIG. 4C is a block diagram of a system for providing a virtual computational storage device that is supported by components external to a computing device executing a hypervisor

Referring to FIG. 4C, an alternative implementation of the system 400 is shown in which the computing device 402 communicates (e.g., via PCIe or some other connection) with a compute element 450 and a storage element 452. The compute element 450 may include a processing device (e.g., an FPGA), and may correspond to the compute element 106, the first compute element 218, the second compute element 220, the first compute element 306, or the second compute element 312 described above. The storage element 452 may include a non-volatile storage device (e.g., a non-computational storage device) and may correspond to the storage element 108, the first storage element 202, the second storage element 204, the first storage element 308, or the second storage element 314.

The virtual computational storage emulation module 410 is configured to provide functionality of the virtual computational storage devices 414, 418 using the external compute element 450 and the storage element 452. Thus, the virtual computational storage emulation module 410 may translate compute requests for the virtual computational storage devices 414, 418 into compute requests for the compute element 450 and translate storage requests for the virtual computational storage devices 414, 418 into storage requests for the storage element 452, as described above. Accordingly, FIG. 4C illustrates that a computing device (e.g., a server) may provide virtual computational storage device functionality using external components.

Figure 4D:
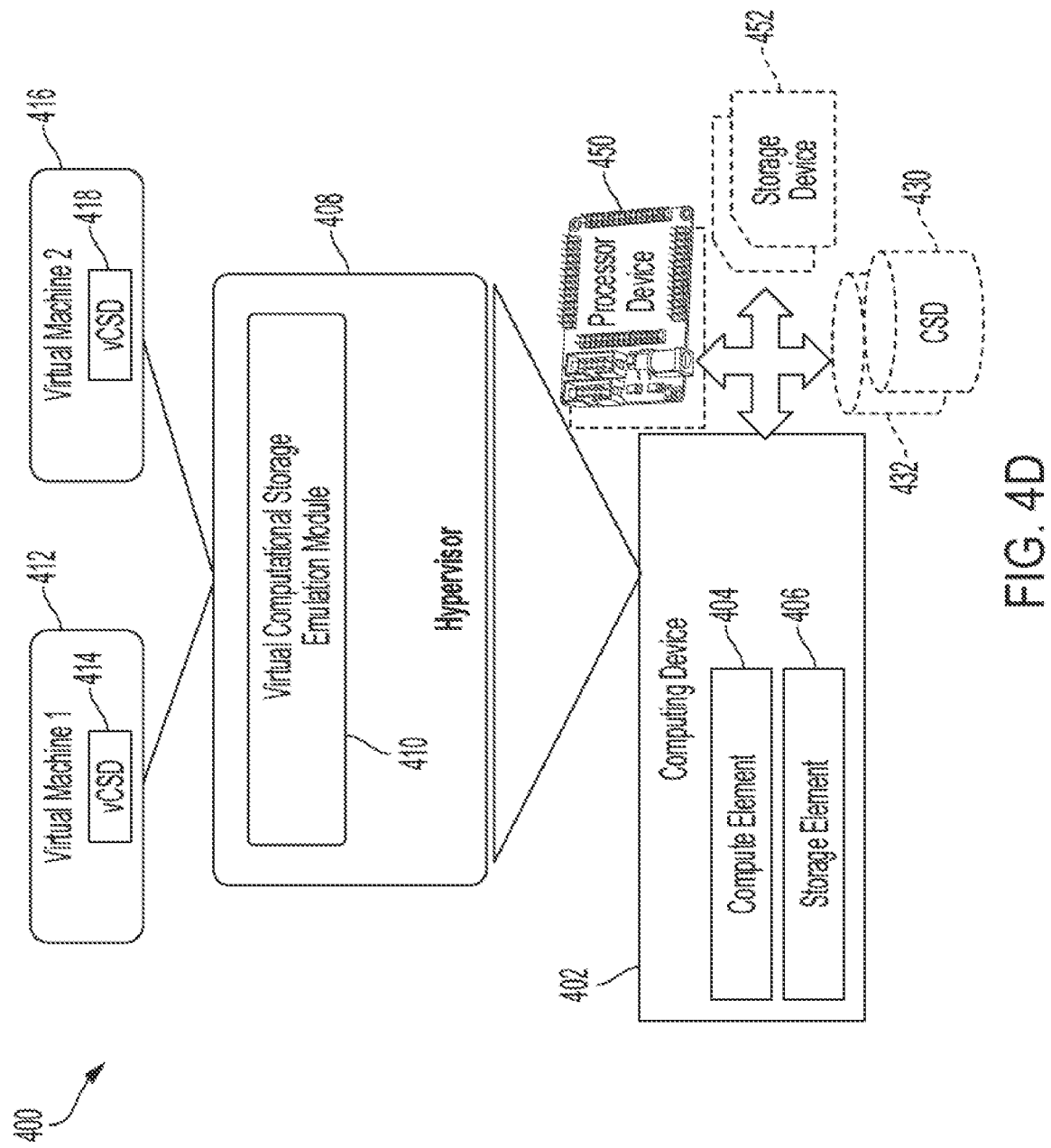
FIG. 4D is a block diagram of a system for providing a virtual computational storage device that is supported by a variety of components.

FIG. 4D illustrates that the virtual computational storage emulation module 410 may provide virtual computational storage devices using any combination of devices described with reference to FIG. 4A-C. Thus, the virtual computational storage emulation module 410 may provide a virtual computing device that corresponds to an internal (to a device executing the virtual computational storage emulation module) processing element, an internal storage device, an external (to a device executing the virtual computational storage emulation module) processing element, an external storage device, a physical computational storage device, or any combination thereof.

Figure 5A:
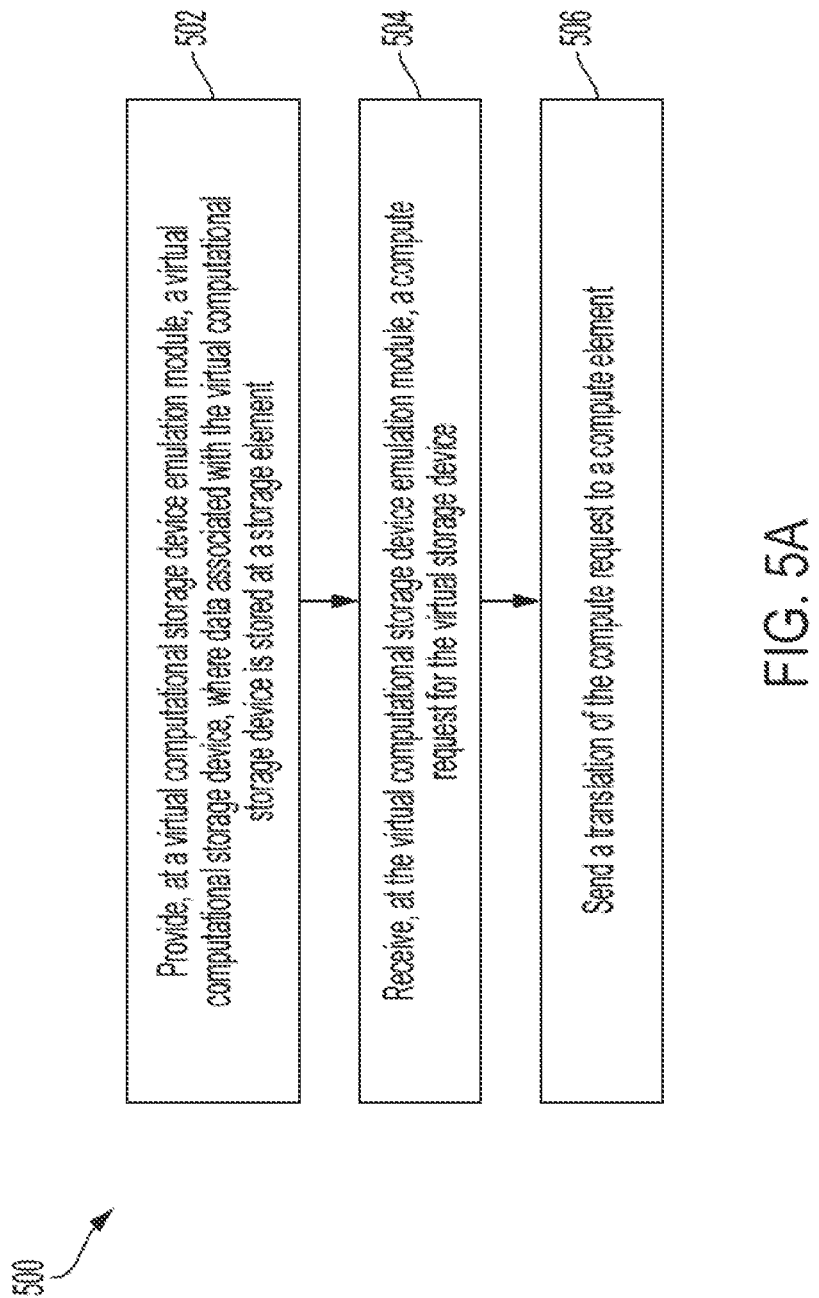
FIG. 5A is a flowchart of a method of providing a virtual computational storage device that supports compute requests.

FIG. 5 is a flowchart of a method 500 for providing a virtual computational storage device. The method 500 may be performed by a virtual computational storage emulation module (e.g., by one or more processors executing such a module), such as the virtual computational storage emulation module 102 or the virtual computational storage emulation module 410. The method 500 includes providing, at a virtual computational storage device emulation module, a virtual computational storage device, wherein data associated with the virtual computational storage device is stored at a storage element, at 502. For example, the virtual computational storage emulation module 102 may provide the virtual computational storage device 110. The data 112 of the virtual computational storage device 110 may be stored at the storage element 108. In another example, the first data 206 of the virtual computational storage device may be stored at the first storage element 202 and the second data 208 may be stored at the second storage element 204. In another example, the virtual computational storage emulation module 102 may provide the first virtual computational storage device 302 and the second virtual computational storage device 304. The first data 310 of the first virtual computational storage device 302 may be stored at the first storage element 308 and the second data 316 of the second virtual computational storage device 304 may be stored at the second storage element 314. In another example, the first data 310 of the first virtual computational storage device 302 and the second data 316 of the second virtual computational storage device 304 may be stored at the storage element 330.

The method 500 further includes receiving, at the virtual computational storage device emulation module, a compute request for the virtual storage device, at 504. For example, the virtual computational storage emulation module 102 may receive the compute request 114, the CSD command 118, the first compute request 224, the second compute request 228, the first compute request 352, or the second compute request 354 from the computational storage client 104.

The method 500 further includes sending a translation of the compute request to a compute element, at 506. For example, the virtual computational storage emulation module 102 may send a translation of the compute request 114, the first compute request 224, the second compute request 228, the first compute request 352, or the second compute request 354 (e.g., the hardware command 120) to the compute element 106, the first compute element 218, the second compute element 220, the first compute element 306, or the second compute element 312. Generating the translation may include mapping a request in a first protocol (e.g., NVMe) to a request in a second protocol (e.g., a protocol supported by the processing element).

Thus, the method 500 may provide a technique for virtualization of a computational storage device. Accordingly, a computational storage client may enjoy the benefits of a computational storage device in systems that have a wide variety of underlying physical components.

In some examples, the method 500 further includes initializing a virtual computational storage device. For example, the virtual computational storage emulation module 102 or the virtual computational storage emulation module 410 may generate one or more mapping tables of virtual computational storage devices to physical components. The mapping tables may map addresses of virtual computational storage devices to addresses of physical storage devices. The mapping tables may further map virtual computational storage devices to compute elements. Physical components may be assigned to a virtual computational storage device and the mapping tables may be setup based on commands from a computational storage client, based on a load balancing algorithm, or a combination thereof.

Figure 5B:
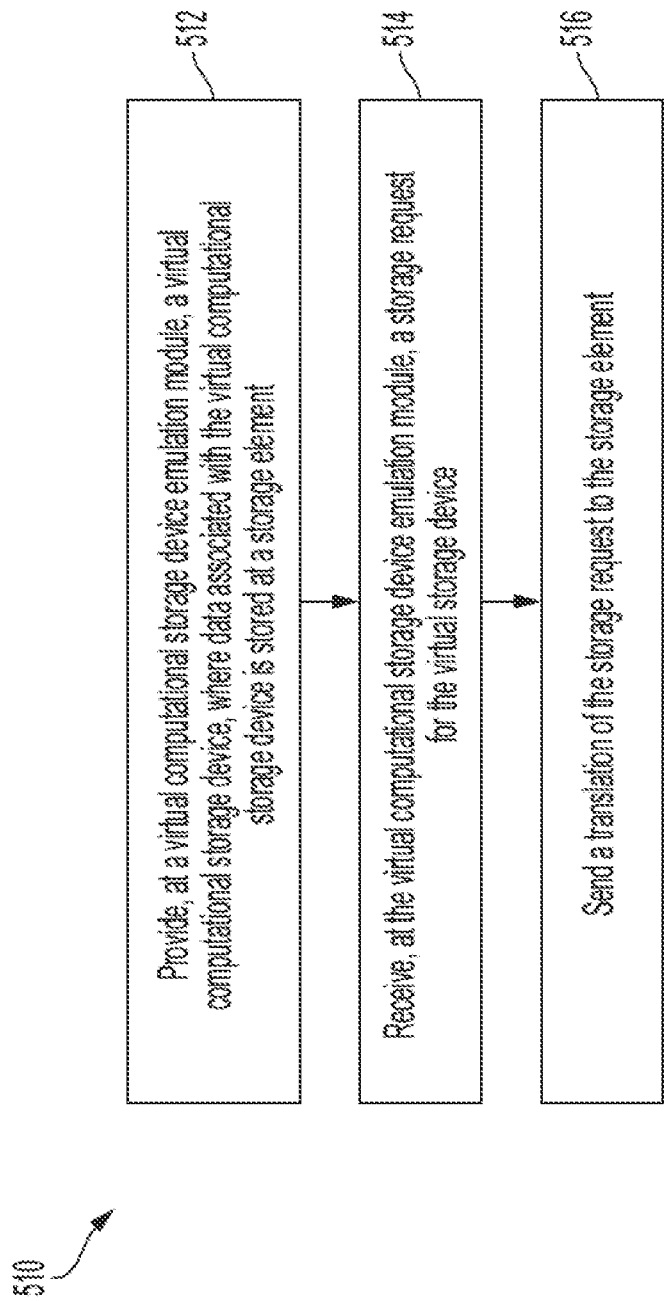
FIG. 5B is a flowchart of a method of providing a virtual computational storage device that supports storage requests.

FIG. 5B is a flowchart of a method 510 of providing a virtual computational storage device that supports storage requests. The method 510 may be performed by a virtual computational storage emulation module (e.g., by one or more processors executing such a module), such as the virtual computational storage emulation module 102 or the virtual computational storage emulation module 410. The method 510 includes providing, at a virtual computational storage device emulation module, a virtual computational storage device, where data associated with the virtual computational storage device is stored at a storage element, at 512. For example, the virtual computational storage emulation module 102 may provide the virtual computational storage device 110. The data 112 of the virtual computational storage device 110 may be stored at the storage element 108. In another example, the first data 206 of the virtual computational storage device may be stored at the first storage element 202 and the second data 208 may be stored at the second storage element 204. In another example, the virtual computational storage emulation module 102 may provide the first virtual computational storage device 302 and the second virtual computational storage device 304. The first data 310 of the first virtual computational storage device 302 may be stored at the first storage element 308 and the second data 316 of the second virtual computational storage device 304 may be stored at the second storage element 314. In another example, the first data 310 of the first virtual computational storage device 302 and the second data 316 of the second virtual computational storage device 304 may be stored at the storage element 330.

The method 510 further includes receiving, at the virtual computational storage device emulation module, a storage request for the virtual storage device, at 514. For example, the virtual computational storage emulation module 102 may receive the storage request 116, the CSD command 118, the first storage request 210, the second storage request 214, the first storage request 332, or the second storage request 334 from the computational storage client 104.

The method 510 further includes sending a translation of the storage request to the storage element, at 516. For example, the virtual computational storage emulation module 102 may send a translation of the storage request 116, the CSD command 118, the first storage request 210, the second storage request 214, the first storage request 332, or the second storage request 334 (e.g., the hardware command 120) to the storage element 108, the first storage element 202, the second storage element 204, the first storage element 308, or the second storage element 314. Generating the translation may include mapping a request in a first protocol (e.g., NVMe) to a request in a second protocol (e.g., a protocol supported by the storage element).

Thus, the method 510 may provide a technique for virtualization of a computational storage device that supports storage commands. Accordingly, a computational storage client may enjoy the benefits of a computational storage device in systems that have a wide variety of underlying physical components.

Figure 5C:
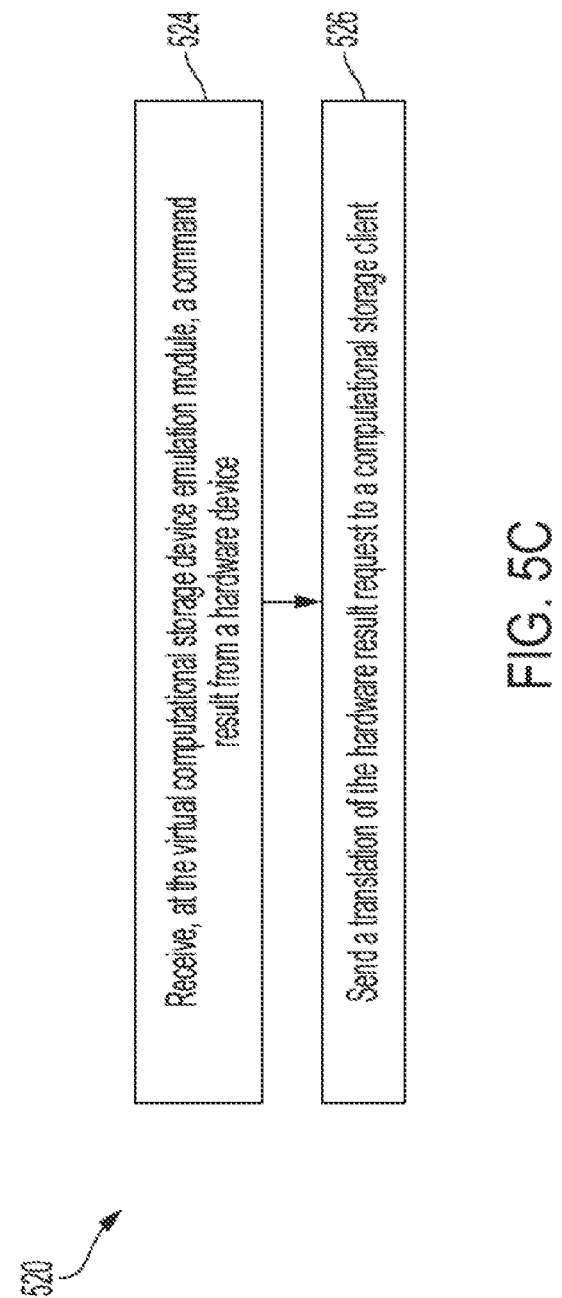
FIG. 5C is a flowchart of a method of providing a virtual computational storage device that returns command results in a computational storage format.

FIG. 5C is a flowchart of a method 520 of providing a virtual computational storage device that returns command results in a computational storage format. The method 520 may be performed by a virtual computational storage emulation module (e.g., by one or more processors executing such a module), such as the virtual computational storage emulation module 102 or the virtual computational storage emulation module 410. The method includes receiving, at the virtual computational storage device emulation module, a command results from a hardware device, at 524. For example, the virtual computational storage emulation module 102 may receive the hardware result 122. From the compute element 106 (or the storage element 108). The hardware result 122 may correspond to a message generated in response to a compute or storage command. For example, the hardware result 122 may include a result of a computation from the compute element 106 or data retrieved from the storage element 108.

The method 520 further includes sending a translation of the hardware result to a computational storage client, at 526. For example, the virtual computational storage emulation module 102 may send the CSD result 124 to the computational storage client 104. The CSD result 124 may correspond to a translated version of the hardware result 122. In some implementations, the CSD result 124 is a message that conforms to the NVMe protocol though the hardware result 122 may conform to a different protocol.

Thus, the method 520 may provide a technique for virtualization of a computational storage device that returns results of commands to a computational storage client. Accordingly, a computational storage client may enjoy the benefits of a computational storage device in systems that have a wide variety of underlying physical components. It should be noted that one or more of the methods 500, 510, 520 (or aspects thereof) may be combined and/or performed by the same device.

Figure 6:
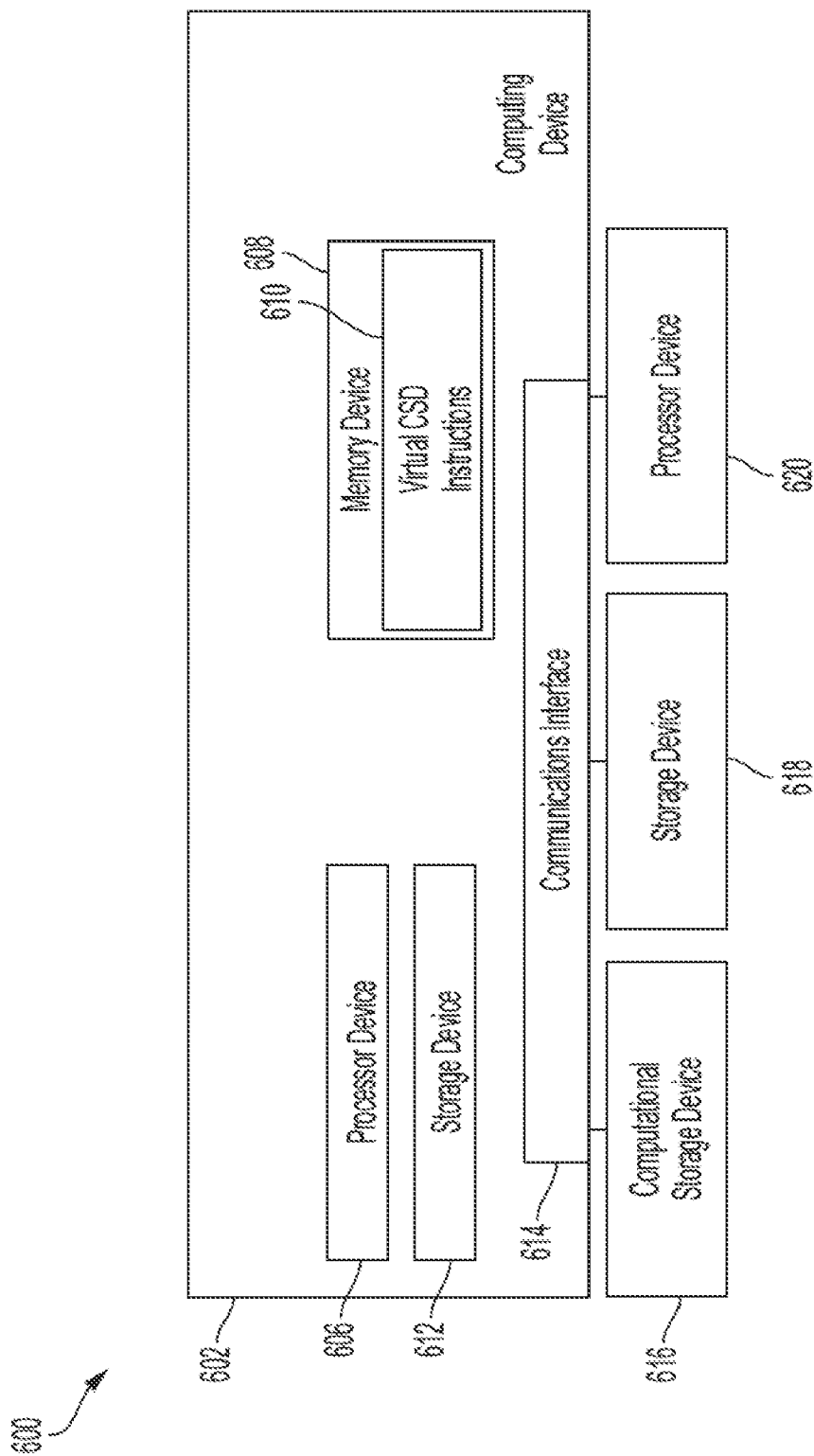
FIG. 6 is a block diagram of a computing system for providing a virtual computational storage device.

FIG. 6 is a block diagram of a computing system 600 that may provide a virtual computational storage device. The computing system 600 includes a computing device 602. The computing device 602 may correspond to the computing device 402 described above. The computing device 602 includes a processor device 606 and a memory device 608. The processor device 606 may include a CPU, a CPU core, another type of processor device, or a combination thereof.

The memory device 608 may include non-volatile memory, volatile memory, or a combination thereof. As used herein, the memory device 608 is an article of manufacture. The memory device 608 stores virtual computational storage device (CSD) instructions 610 executable by the processor device 606 to provide a virtual computational storage device. The virtual CSD instructions may correspond to the virtual computational storage emulation module 102, the hypervisor 408, the virtual computational storage emulation module 410, or a combination thereof. The virtual CSD instructions 610 may be executable by the processor device 606 to perform one or more of the methods 500, 510, 520.

The computing system 600 further includes a storage device 612. The storage device 612 may correspond to a non-volatile storage device, such as a solid state drive or other storage device.

The computing device further includes a communications interface 614 configured to communicate with external components. The communications interface 614 may correspond to an Ethernet interface, an IEEE 802.11 interface, a PCIe interface, a SATA interface, a SAS interface, another type of interface, or a combination thereof. In some implementations, the communications interface 614 may be configured to send messages to and/or receive messages from a computational storage client, such as the computational storage client 104.

The communications interface 614 is connected to a computational storage device 616, a storage device 618, and a processor device 620. The virtual CSD instructions 610 are executable by the processor device 606 to provide a virtual computational storage device that utilizes one or more compute elements and one or more storage elements. The one or more compute elements may include the processor device 606, the computational storage device 616, the processor device 620, or a combination thereof. The one or more storage elements may include the storage device 612, the computational storage device 616, the storage device 618, or a combination thereof. The processor device 606 may correspond to the compute element 106, the first compute element 218, the second compute element 220, the first compute element 306, the second compute element 312, the compute element 404, the first compute element 434, the second compute element 438, the compute element 450, or a combination thereof. The computational storage device 616 may correspond to the compute element 106, the first compute element 218, the second compute element 220, the first compute element 306, the second compute element 312, the first computational storage device 430, the second computational storage device 432, or a combination thereof. The processor device 620 may correspond to the compute element 106, the first compute element 218, the second compute element 220, the first compute element 306, the second compute element 312, the compute element 450, or a combination thereof.

In some implementations the memory device 608 further includes instructions executable by the processor device 606 to provide a computational storage client, such as the computational storage client 104, the first virtual machine 412, the second virtual machine 416, or a combination thereof.

The storage device 612 may correspond to the storage element 108, the first storage element 202, the second storage element 204, the first storage element 308, the second storage element 314, the storage element 330, the first storage element 308, the second storage element 314, the storage element 406, or a combination thereof. The computational storage device 616 may correspond to the storage element 108, the first storage element 202, the second storage element 204, the first storage element 308, the second storage element 314, the storage element 330, the first storage element 308, the first computational storage device 430, the second computational storage device 432, or a combination thereof. The storage device 618 may correspond to the storage element 108, the first storage element 202, the second storage element 204, the first storage element 308, the second storage element 314, the storage element 330, the first storage element 308, the storage element 452, or a combination thereof.

Thus, the computing system 600 may provide virtualization of a computational storage device, as described herein. The computing system 600 may include more or fewer components that illustrated. To illustrate, some examples may not include the computational storage device 616, the storage device 618, the processor device 620, or any combination thereof.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media.

The word "exemplary" is used herein to mean "serving as an example, instance, or illustration." Any embodiment described herein as "exemplary" is not necessarily to be construed as preferred or advantageous over other embodiments. The terms "computing device", "user device", "communication station", "station", "handheld device", "mobile device", "wireless device" and "user equipment" (UE) as used herein refers to a wireless communication device such as a cellular telephone, smartphone, tablet, netbook, wireless terminal, laptop computer, a femtocell, High Data Rate (HDR) subscriber station, access point, printer, point of sale device, access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as 'communicating', when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

Some embodiments may be used in conjunction with various devices and systems, for example, a Personal Computer (PC), a desktop computer, a mobile computer, a laptop computer, a notebook computer, a tablet computer, a server computer, a handheld computer, a handheld device, a Personal Digital Assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (A/V) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with one way and/or two-way radio communication systems, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like.

Some embodiments may be used in conjunction with one or more types of wireless communication signals and/or systems following one or more wireless communication protocols, for example, Radio Frequency (RF), Infrared (IR), Frequency-Division Multiplexing (FDM), Orthogonal FDM (OFDM), Time-Division Multiplexing (TDM), Time-Division Multiple Access (TDMA), Extended TDMA (E-TDMA), General Packet Radio Service (GPRS), extended GPRS, Code-Division Multiple Access (CDMA), Wideband CDMA (WCDMA), CDMA 2000, single-carrier CDMA, multi-carrier CDMA, Multi-Carrier Modulation (MDM), Discrete Multi-Tone (DMT), Bluetooth™, Global Positioning System (GPS), Wi-Fi, Wi-Max, ZigBee™, Ultra-Wideband (UWB), Global System for Mobile communication (GSM), 2G, 2.5G, 3G, 3.5G, 4G, Fifth Generation (5G) mobile networks, 3GPP, Long Term Evolution (LTE), LTE advanced, Enhanced Data rates for GSM Evolution (EDGE), or the like. Other embodiments may be used in various other devices, systems, and/or networks.

Although an example processing system has been described above, embodiments of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more components of computer program instructions, encoded on computer storage medium for execution by, or to control the operation of, information/data processing apparatus. Alternatively, or in addition, the program instructions can be encoded on an artificially-generated propagated signal, for example a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (for example multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, for example an FPGA (field programmable gate array) or an ASIC (application-specific integrated circuit). The apparatus can also include, in addition to hardware, code that creates an execution environment for the computer program in question, for example code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a component, component, subroutine, object, or other unit suitable for use in a computing environment. A computer program may, but need not, correspond to a file in a file system. A program can be stored in a portion of a file that holds other programs or information/data (for example one or more scripts stored in a markup language document), in a single file dedicated to the program in question, or in multiple coordinated files (for example files that store one or more components, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory or a random access memory or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, for example magnetic, magneto-optical disks, or optical disks. However, a computer need not have such devices. Devices suitable for storing computer program instructions and information/data include all forms of non-volatile memory, media and memory devices, including by way of example semiconductor memory devices, for example EPROM, EEPROM, and flash memory devices; magnetic disks, for example internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, for example a CRT (cathode ray tube) or LCD (liquid crystal display) monitor, for displaying information/data to the user and a keyboard and a pointing device, for example a mouse or a trackball, by which the user can provide input to the computer. Other kinds of devices can be used to provide for interaction with a user as well; for example, feedback provided to the user can be any form of sensory feedback, for example visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, for example as an information/data server, or that includes a middleware component, for example an application server, or that includes a front-end component, for example a client computer having a graphical user interface or a web browser through which a user can interact with an embodiment of the subject matter described herein, or any combination of one or more such back-end, middleware, or front-end components. The components of the system can be interconnected by any form or medium of digital information/data communication, for example a communication network. Examples of communication networks include a local area network ("LAN") and a wide area network ("WAN"), an inter-network (for example the Internet), and peer-to-peer networks (for example ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (for example an HTML page) to a client device (for example for purposes of displaying information/data to and receiving user input from a user interacting with the client device). Information/data generated at the client device (for example a result of the user interaction) can be received from the client device at the server.

While this specification contains many specific embodiment details, these should not be construed as limitations on the scope of any embodiment or of what may be claimed, but rather as descriptions of features specific to particular embodiments. Certain features that are described herein in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain embodiments, multitasking and parallel processing may be advantageous.

Many modifications and other embodiments of the disclosure set forth herein will come to mind to one skilled in the art to which these embodiments pertain having the benefit of the teachings presented in the foregoing descriptions and the associated drawings. Therefore, it is to be understood that the embodiments are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A system comprising:
a first storage element configured to store first data;
a first compute element;
a second compute element; and
a processor configured to execute instructions for providing a virtual computational storage device, the instructions further causing the processor to:
receive a first compute request associated with the virtual computational storage device;
determine that the first compute request is directed to the first data stored in the first storage element;
based on the instructions that cause the processor to determine that the first compute request is directed to the first data, send the first compute request to the first compute element for generating a first output based on the first compute request, wherein the first compute request is associated with the first data;
receive a second compute request associated with the virtual computational storage device; and
send the second compute request to the second compute element for generating a second output based on the second compute request.

2. The system of claim 1, wherein the first storage element comprises a solid state drive, and wherein the first storage element, the first compute element, and the second compute element correspond to components of a computational storage device.

3. The system of claim 1, wherein the first storage element, the first compute element, and the second compute element correspond to components of a server device.

4. The system of claim 1, wherein the first storage element corresponds to a component of a storage device, and wherein one of the first compute element or the second compute element corresponds to a component of a device distinct from the storage device.

5. The system of claim 1, wherein the instructions further cause the processor to advertise availability of the virtual computational storage device.

6. The system of claim 1, wherein the system further includes a second storage element, wherein the instructions further cause the processor to store second data associated with the virtual computational storage device at the second storage element.

7. The system of claim 6, wherein a first address range of the virtual computational storage device is associated with the first storage element, wherein a second address range of the virtual computational storage device is associated with the second storage element, and wherein the instructions further cause the processor to:
store the first data at the first storage element in response to a first request to store the first data for the first address range; and
store the second data at the second storage element in response to a second request to store the second data for the second address range.

8. The system of claim 6, wherein the instructions further cause the processor to select the second storage element to store the second data based on a load balancing algorithm.

9. The system of claim 1, wherein the instructions further cause the processor to:
translate the first compute request to generate a translated first compute request, wherein the translated first compute request is configured to be sent to the first compute element for generating the first output.

10. The system of claim 1, wherein the instructions further cause the processor to select the second compute element for the second compute request based on an address of second data associated with the second compute request.

11. The system of claim 1, wherein the instructions further cause the processor to select the second compute element for the second compute request based on a load balancing algorithm.

12. The system of claim 1, wherein the instructions further cause the processor to provide a second virtual computational storage device.

13. The system of claim 12, wherein the instructions further cause the processor to store second data associated with the second virtual computational storage device at the first storage element.

14. The system of claim 12, wherein the instructions further cause the processor to send a third compute request associated with the second virtual computational storage device to the first compute element.

15. A method comprising:
providing, by a processor, a virtual computational storage device, wherein first data associated with the virtual computational storage device is stored at a first storage element;
receiving, by the processor, a first compute request associated with the virtual computational storage device;
determining, by the processor, that the first compute request is directed to the first data stored in the first storage element;
based on the determining that the first compute request is directed to the first data, sending the first compute request to a first compute element for generating a first output based on the first compute request, wherein the first compute request is associated with the first data;
receiving, by the processor, a second compute request associated with the virtual computational storage device; and
sending, by the processor, the second compute request to a second compute element for generating a second output based on the second compute request.

16. The method of claim 15, wherein second data associated with the virtual computational storage device is stored at a second storage element.

17. The method of claim 16, wherein a first address range of the virtual computational storage device is associated with the first storage element, wherein a second address range of the virtual computational storage device is associated with the second storage element, the method further comprising:
- storing the first data at the first storage element in response to a first request to store the first data for the first address range; and
- storing the second data at the second storage element in response to a second request to store the second data for the second address range.

18. The method of claim 15, further comprising:
- receiving a storage request identifying a first address of the virtual computational storage device; and
- sending a translated storage request to the first storage element, the translated storage request identifying a translated address of the first storage element.

19. The method of claim 15 further comprising:
- translating, by the processor, the first compute request to generate a translated first compute request, wherein the translated first compute request is sent to the first compute element for generating the first output.

20. The method of claim 15 further comprising:
- selecting the second compute element for the second compute request based on an address of second data associated with the second compute request.

* * * * *